United States Patent
Lee et al.

(10) Patent No.: US 9,530,046 B2
(45) Date of Patent: Dec. 27, 2016

(54) DIGITAL DEVICE AND METHOD OF SHARING IMAGE WITH AT LEAST ONE PERSON CONTAINED IN THE IMAGE

(71) Applicant: LG ELECTRONICS INC., Seoul (KR)

(72) Inventors: Doyoung Lee, Seoul (KR); Youngjin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 14/074,169

(22) Filed: Nov. 7, 2013

(65) Prior Publication Data

US 2015/0033150 A1 Jan. 29, 2015

(30) Foreign Application Priority Data

Jul. 24, 2013 (KR) ........................ 10-2013-0087516

(51) Int. Cl.
| | | |
|---|---|---|
| *H04N 1/00* | (2006.01) | |
| *G06K 9/00* | (2006.01) | |
| *G06Q 50/00* | (2012.01) | |
| *H04N 5/232* | (2006.01) | |

(52) U.S. Cl.
CPC ........... *G06K 9/00288* (2013.01); *G06Q 50/01* (2013.01); *H04N 1/00153* (2013.01); *H04N 5/23206* (2013.01); *H04N 5/23216* (2013.01); *H04N 5/23219* (2013.01); *H04N 5/23293* (2013.01)

(58) Field of Classification Search
CPC ............ H04N 5/23219; H04N 1/00336; H04N 1/32128; H04N 2201/0084; G06K 9/00221
USPC .......................................... 382/118, 173, 190
See application file for complete search history.

(56) References Cited

U.S. PATENT DOCUMENTS

| | | | |
|---|---|---|---|
| 2008/0098316 A1 | 4/2008 | Declan | |
| 2008/0193018 A1 | 8/2008 | Masuda | |
| 2008/0243861 A1* | 10/2008 | Wassingbo et al. | ............ 707/10 |
| 2010/0166316 A1 | 7/2010 | Choi et al. | |
| 2010/0295968 A1 | 11/2010 | Lee et al. | |
| 2014/0040775 A1* | 2/2014 | Stoop et al. | ................... 715/753 |
| 2014/0118829 A1* | 5/2014 | Ma | ....................... G02B 5/1885 359/567 |

FOREIGN PATENT DOCUMENTS

| | | |
|---|---|---|
| JP | 2006-323621 A | 11/2006 |
| JP | 2012-160212 A | 8/2012 |
| KR | 10-2010-0076793 A | 7/2010 |

* cited by examiner

*Primary Examiner* — Alvin Tan
*Assistant Examiner* — Rinna Yi
(74) *Attorney, Agent, or Firm* — Birch, Stewart, Kolasch & Birch, LLP

(57) ABSTRACT

Disclosed is a method of, in a case in which at least one person contained in a displayed image is recognized, sharing the image with the at least one person contained in the image while displaying the number of sharing and the number of capturing.

18 Claims, 20 Drawing Sheets

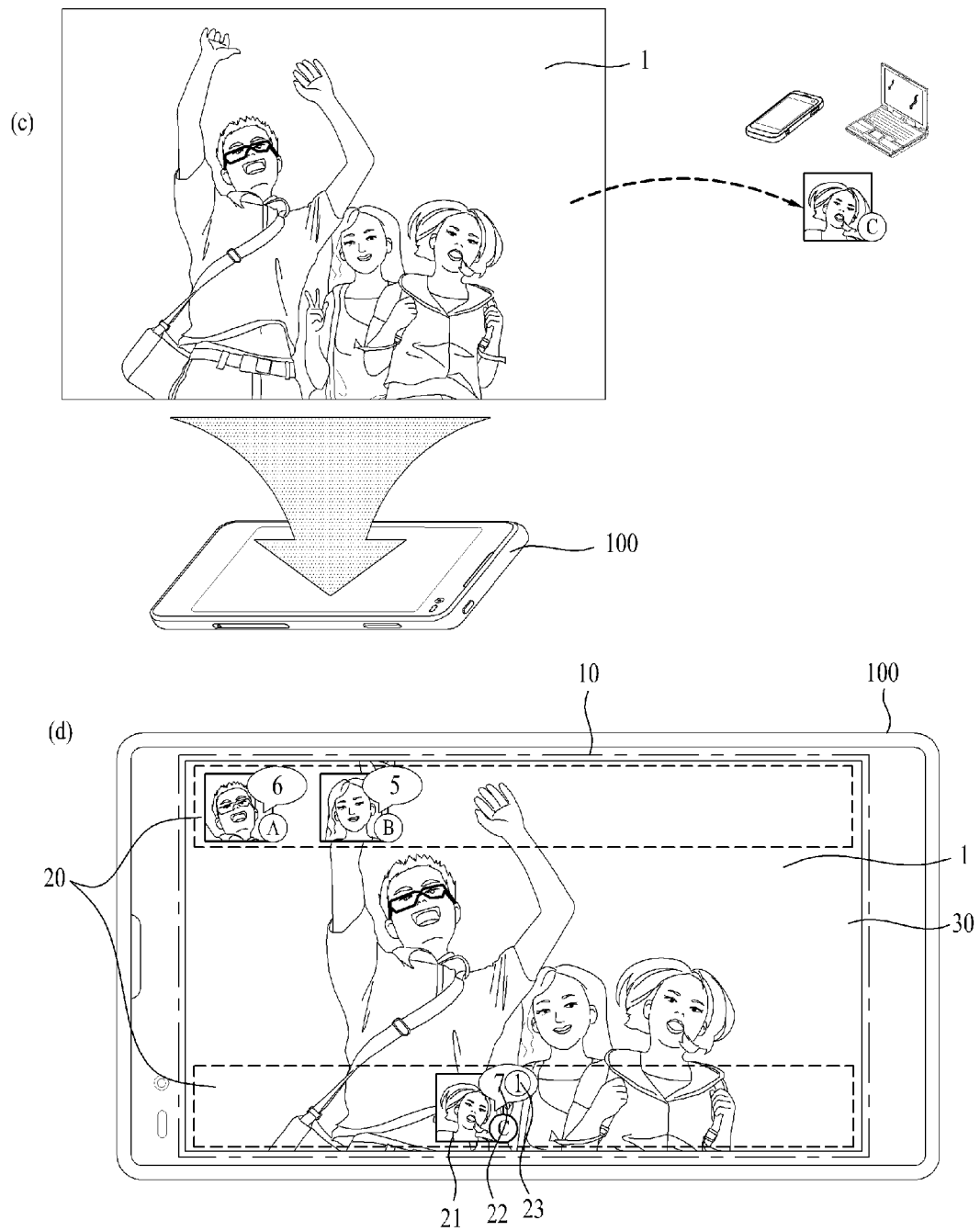

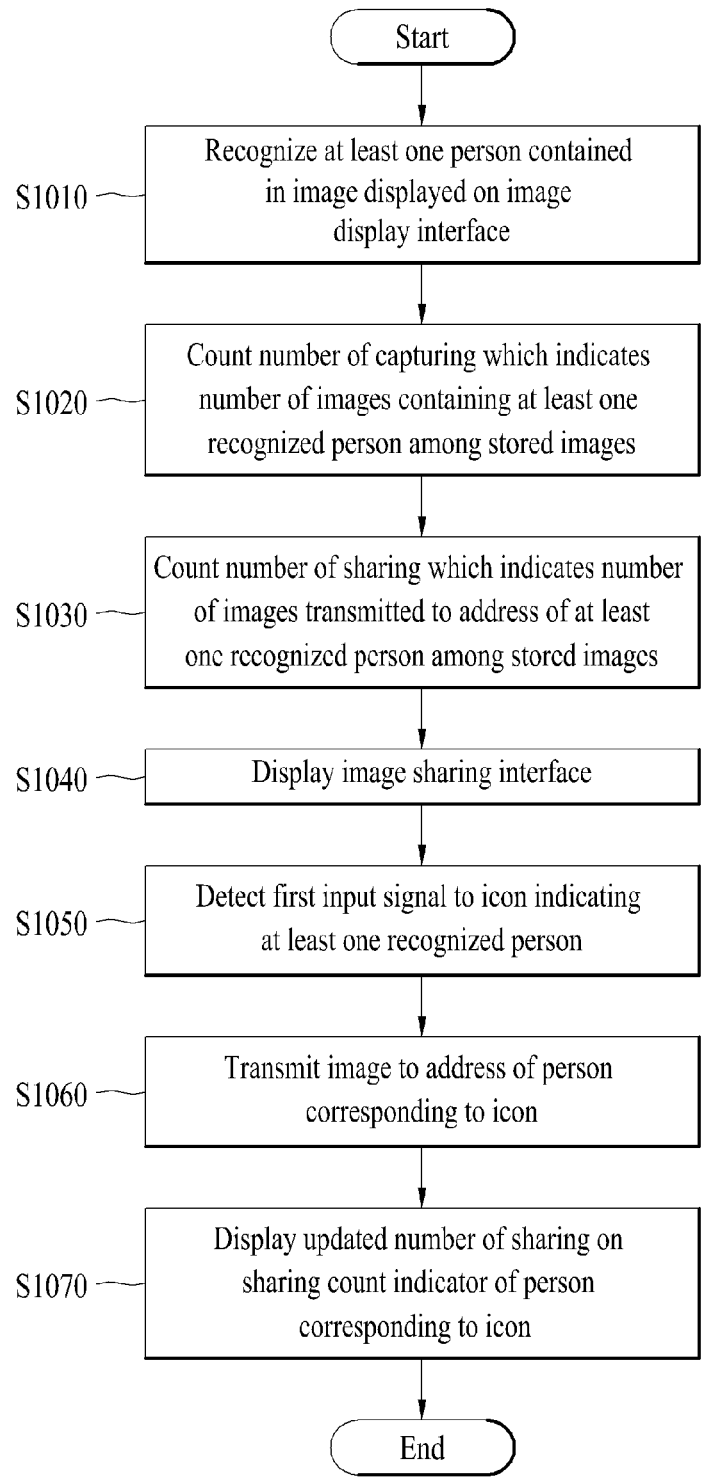

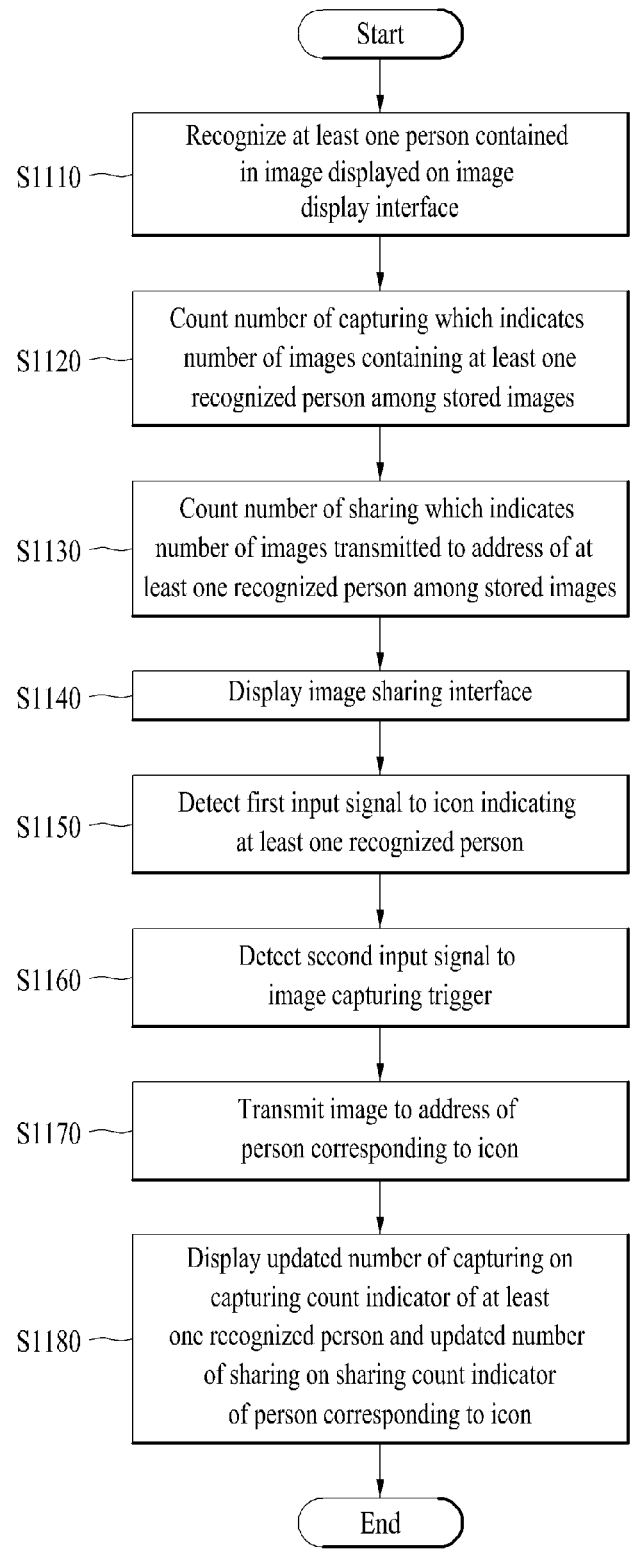

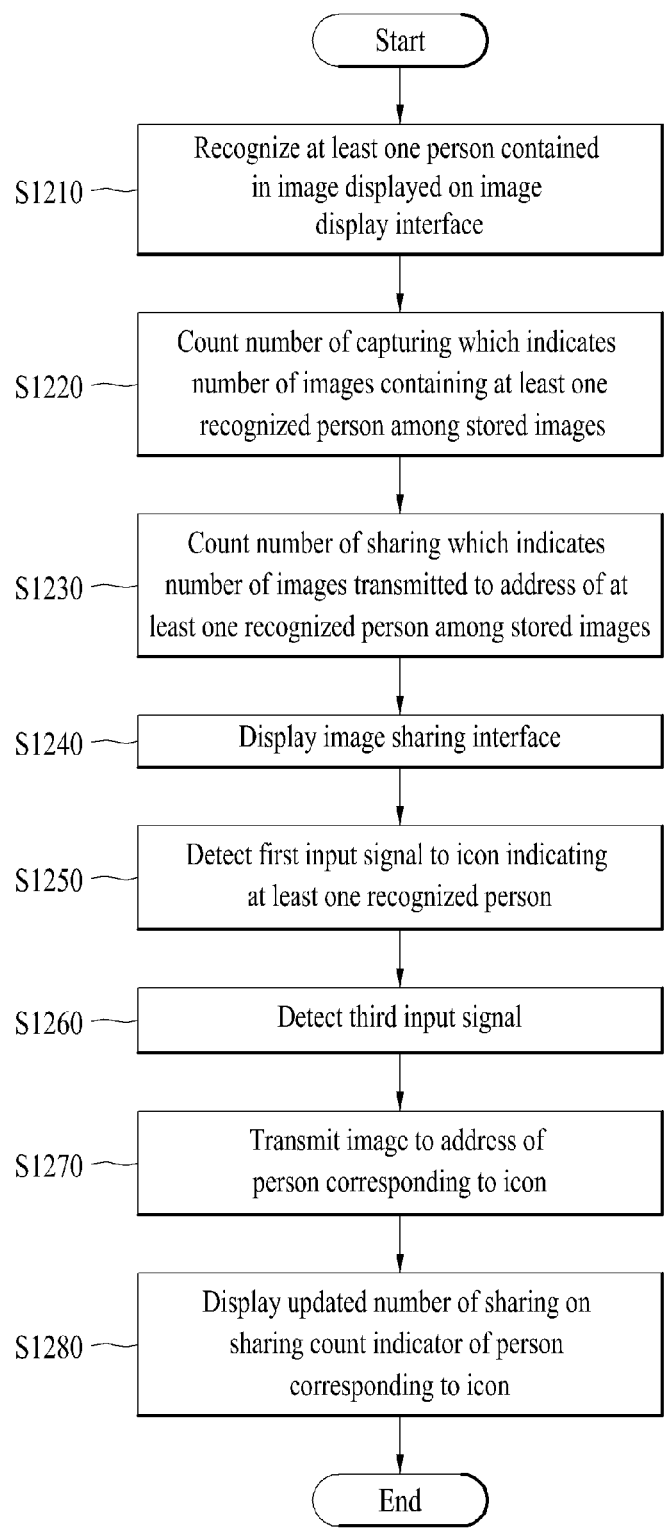

DIGITAL DEVICE AND METHOD OF SHARING IMAGE WITH AT LEAST ONE PERSON CONTAINED IN THE IMAGE

Pursuant to 35 U.S.C. §119(a), this application claims the benefit of Korean Patent Application No. 10-2013-0087516, filed on Jul. 24, 2013, which is hereby incorporated by reference as if fully set forth herein.

BACKGROUND OF THE INVENTION

Field of the Invention

The disclosure relates to a digital device and a control method thereof and, more particularly, to a method of, in a case in which at least one person contained in a displayed image is recognized, sharing the image with the at least one person contained in the image while displaying the number of sharing and the number of capturing.

Discussion of the Related Art

With advances in technology, a biometric technology for reading and analyzing a specific portion of the body of a user and comparing the read and analyzed results with prestored data to identify the user has been rapidly developed. Representative examples of the biometric technology may include facial recognition, fingerprint recognition, and iris recognition.

The facial recognition is widely used in various fields for identification, time checking, passing through a gate, substitute for passwords, etc. In addition, a mobile device, such as a smartphone, equipped with a camera uses the facial recognition to recognize a person contained in an image. Consequently, a user may share an image containing a person with the person in various manners using the facial recognition.

SUMMARY OF THE INVENTION

Accordingly, the disclosure is directed to a digital device and a control method thereof that substantially obviate one or more problems due to limitations and disadvantages of the related art.

An object of the disclosure is to share an image displayed on a digital device with at least one person contained in the image.

Another object of the disclosure is to display, on an image displayed on a digital device, a capturing count indicator and a sharing count indicator of at least one person contained in the image such that a user easily recognizes the number of capturing and the number of sharing.

Another object of the disclosure is to, upon detecting at least one input signal, capture a displayed image or transmit the image to an address of a predetermined person based on the detected input signal.

A further object of the disclosure is to provide various user interfaces configured to capture or share an image such that a user easily captures and shares the image.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a digital device includes a camera unit configured to sense an image, a display unit configured to display the image, a storage unit configured to store the image, a communication unit configured to transmit the image, a sensor unit configured to detect a user input and to an input signal according to a detected result to a processor, and the processor configured to control the camera unit, the display unit, the storage unit, the communication unit, and the sensor unit, wherein the processor is further configured to: recognize at least one person contained in an image displayed on an image display interface, count the number of capturing which indicates the number of images containing the at least one recognized person among stored images, count the number of sharing which indicates the number of the images transmitted to an address of the at least one recognized person, display an image sharing interface, wherein the image sharing interface comprises an icon indicating the at least one recognized person contained in the image, a capturing count indicator indicating the number of capturing the at least one recognized person, and a sharing count indicator indicating the number of sharing with the at least one recognized person, detect a first input signal to the icon indicating the at least one recognized person, transmit the image to an address of the person corresponding to the icon, and display the updated number of sharing on the sharing count indicator of the person corresponding to the icon on the sharing count indicator.

In another aspect of the disclosure, a control method of a digital device includes recognizing at least one person contained in an image displayed on an image display interface, counting the number of capturing which indicates the number of images containing the at least one recognized person among stored images, counting the number of sharing which indicates the number of the images transmitted to an address of the at least one recognized person among stored images, displaying an image sharing interface, wherein the image sharing interface comprises an icon indicating the at least one person contained in the image, a capturing count indicator indicating the number of capturing the at least one recognized person, and a sharing count indicator indicating the number of sharing with the at least one recognized person, detecting a first input signal to the icon indicating the at least one recognized person, transmitting the image to an address of the person corresponding to the icon, and displaying the updated number of sharing on the sharing count indicator of the person corresponding to the icon.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 10 is a flowchart showing a control method of a digital device of the disclosure;

FIG. 11 is a flowchart showing a control method of a digital device of the disclosure; and FIG. 12 is a flowchart showing a control method of a digital device of the disclosure.

DETAILED DESCRIPTION OF THE INVENTION

Although the terms used in the following description are selected, as much as possible, from general terms that are widely used at present while taking into consideration the functions of the disclosure, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

Figure 1:
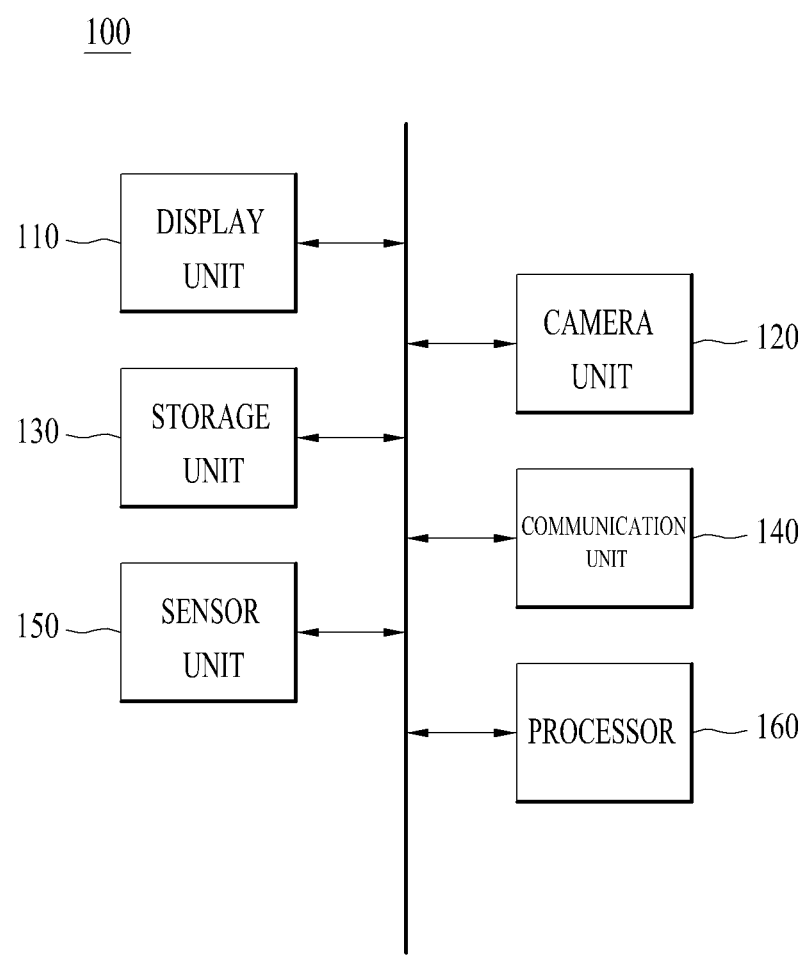
FIG. 1 is a block diagram of a digital device of the disclosure.

FIG. 1 is a block diagram of a digital device of the disclosure. Referring to FIG. 1, a digital device 100 may include a display unit 110, a camera unit 120, a storage unit 130, a communication unit 140, a sensor unit 150, and a processor 160.

The digital device may include various kinds of digital devices, such as a personal digital assistant (PDA), a laptop computer, a tablet PC, and a smartphone, which may display images.

The display unit 110 may output content to a display screen. In addition, the display unit 110 may output an image according to content executed by the processor 140 or a control command from the processor 160. For example, the content may include various kinds of videos and images. In the disclosure, the display unit 110 may display an image. In addition, the display unit 110 may display an image display interface. Furthermore, the display unit 110 may display an image sharing interface.

The camera unit 120 may sense a forward image of the digital device. The forward direction may be a direction in which the camera unit 120 of the digital device 100 faces. In addition, the camera unit 120 may have a predetermined angle of view. The angle of view is a range of horizontal and vertical viewing angles which may be contained in a specific image zone during photographing. In the disclosure, the camera unit 120 may sense a forward image within the predetermined angle of view.

The storage unit 130 may store various kinds of digital data, such as videos, audios, images, and applications. The storage unit 130 may store programs for processing and control of the processor 150 and may serve to temporarily store input/output data. Meanwhile, the storage unit 130 may be located inside/outside the digital device. In the disclosure, the storage unit 130 may store an image captured through the camera unit 130.

The communication unit 140 may communicate with an external device using various protocols to transmit/receive data to/from the external device. In addition, the communication unit 140 may access a network in a wired or wireless fashion to transmit/receive digital data, such as content. For example, the communication unit 140 may use communication standards, such as wireless local area network (WLAN) (Wi-Fi), wireless broadband (WiBro), world interoperability for microwave access (WiMAX), or high speed downlink packet access (HSDPA), to access a wireless network.

In the disclosure, the communication unit 140 may transmit an image displayed on the image display interface to an address of at least one person contained in the image. An address of at least one person may include an email address of the at least one person and an Internet protocol (IP) address of a device owned by the at least one person. In addition, transmission of an image to at least one person may indicate sharing of the image with the at least one person.

The sensor unit 150 may sense an environment surrounding the digital device 100 using at least one sensor equipped in the digital device 100 and may transmit the sensed environment to the processor 160 in the form of a signal. Furthermore, the sensor unit 150 may sense a user input and may transmit a signal based on the sensed result to the processor 160.

In addition, the sensor unit 150 may include at least one sensor. In one embodiment, the at least one sensor may include a gravity sensor, a geomagnetic sensor, a motion sensor, a gyroscope sensor, an acceleration sensor, an infrared sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, a touch sensor, and a grip sensor.

The sensor unit 150 is a generic term of the aforementioned various sensors. The sensor unit 150 may sense various user inputs and a device environment and may provide sensed results to the processor 160 such that the processor 160 may perform operation corresponding to the sensed results. The aforementioned sensors may be embodied as separate elements included in the digital device 100 or may be combined to constitute at least one element included in the digital device 100.

In the disclosure, the sensor unit 150 may detect a user input signal. The user input signal may include a touch input, a drag input, and a hovering input. In one example, the sensor unit 150 may detect a user input signal to an icon contained in the image sharing interface. In another example, the sensor unit 150 may detect a user input signal to an image capturing trigger.

The processor 160 may process data, may control the respective units of the digital device 100, and may control data transmission/reception between the units.

In the disclosure, the processor 160 may recognize at least one person contained in an image displayed on the image display interface. Various face recognition technologies widely used in the art may be used as a method of recognizing at least one person. For example, the processor 160 may quantify position information regarding eyes, a nose, and a mouth of an image containing a specific person and may compare the quantified position information with pre-stored position information regarding eyes, a nose, and a mouth, of the specific person to recognize a face.

In addition, in the disclosure, the processor 160 may count the number of capturing which indicates the number of images containing at least one recognized person among stored images. In addition, the processor 160 may count the number of sharing which indicates the number of images transmitted to an address of at least one recognized person among stored images. In addition, the processor 160 may display an image sharing interface. The image sharing interface may include an icon indicating at least one recognized person contained in an image, a capturing count indicator indicating the number of capturing the at least one recognized person, and a sharing count indicator indicating the number of sharing with the at least one recognized person.

In addition, in the disclosure, the processor 160 may detect an input signal to an icon indicating at least one recognized person. In addition, the processor 160 may transmit an image to an address of a person corresponding to the icon. In addition, the processor 160 may display the updated number of sharing on the sharing count indicator of the person corresponding to the icon. These will hereinafter be described with reference to FIGS. 4 to 9.

Meanwhile, although not shown in FIG. 1, the digital device 100 may include a power unit. The power unit is a power source connected to an internal battery of the digital device 100 or to an external power source. The power unit may supply power to the digital device 100.

FIG. 1 is a block diagram showing one embodiment of the digital device 100 and separate blocks logically classify elements of the digital device 100. Thus, the aforementioned elements of the digital device 100 may be mounted as a single chip or a plurality of chips based on device design.

In one embodiment of the disclosure, operations performed by the digital device 100 may be controlled by the processor 160. For the sake of convenience, in the accompanying drawings and following description, such operations are shown and explained as being performed or controlled by the digital device 100.

Figure 2:
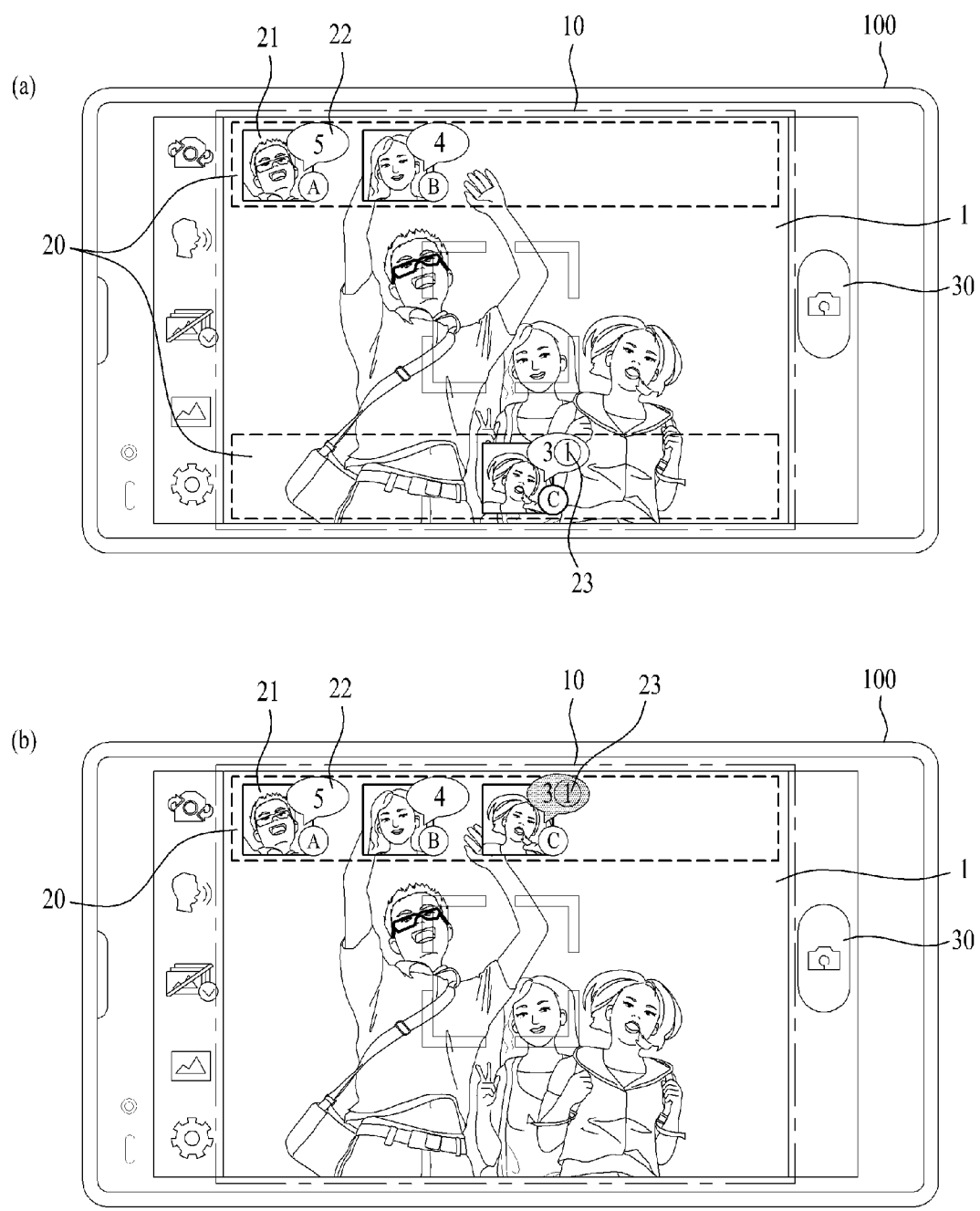
FIGS. 2a to 2c are views showing one embodiment of an image sharing interface of the disclosure.
Figure 2:
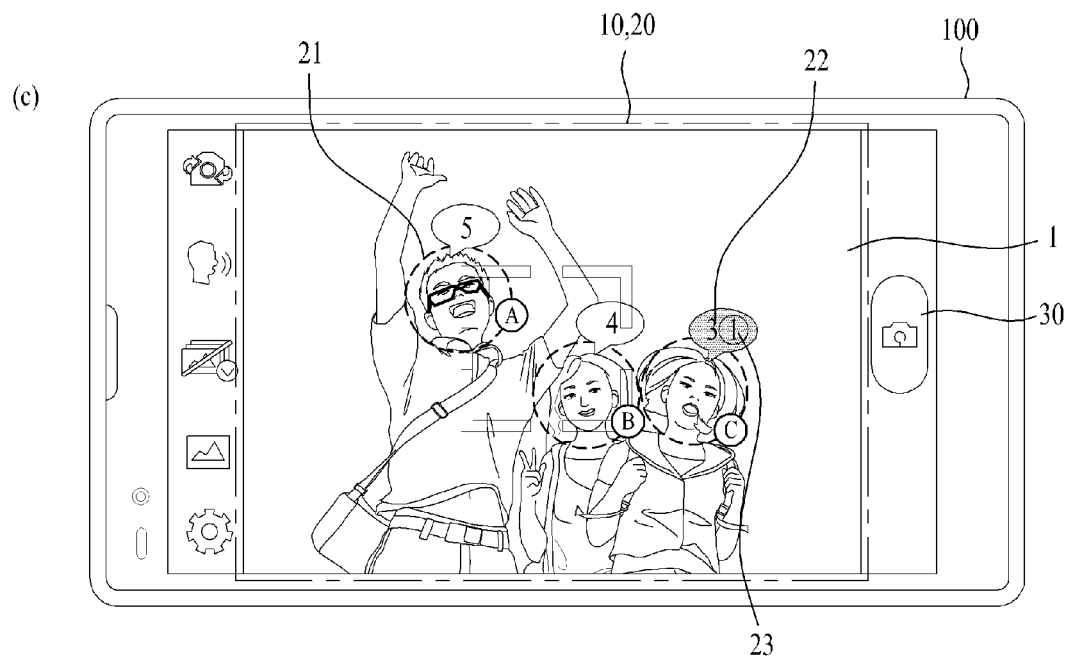
Figure 3:
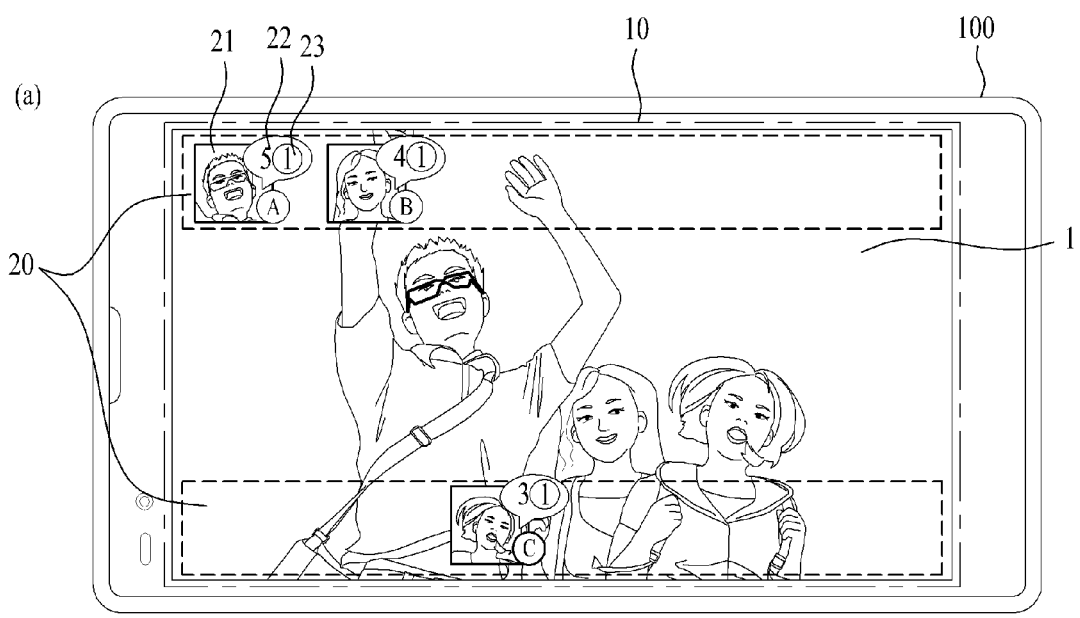
FIGS. 3a to 3c are views showing another embodiment of an image sharing interface of the disclosure.
Figure 3:
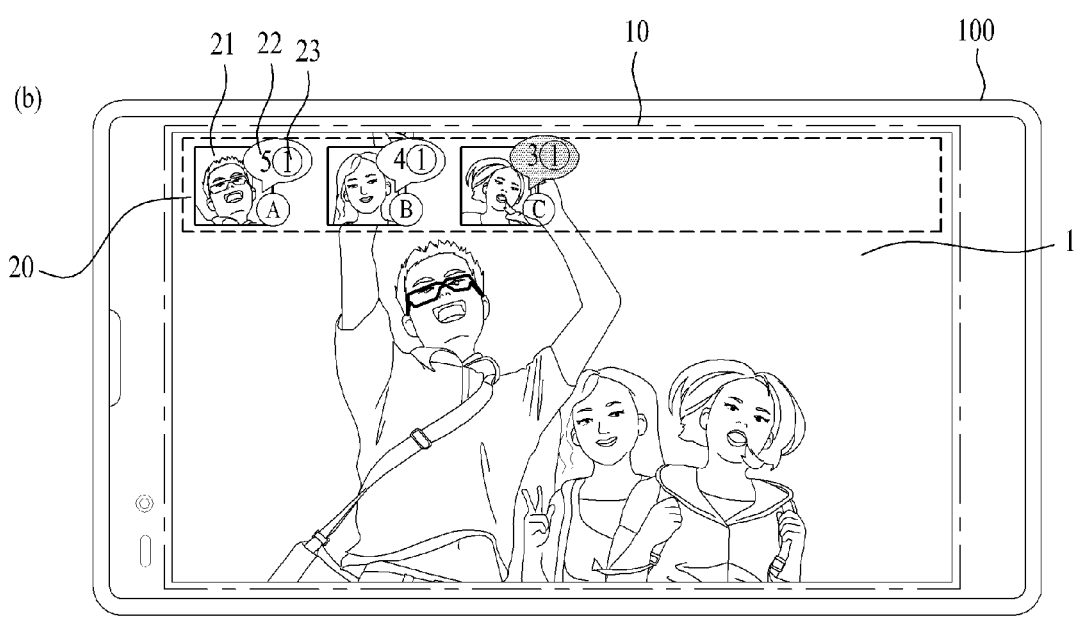
Figure 3:
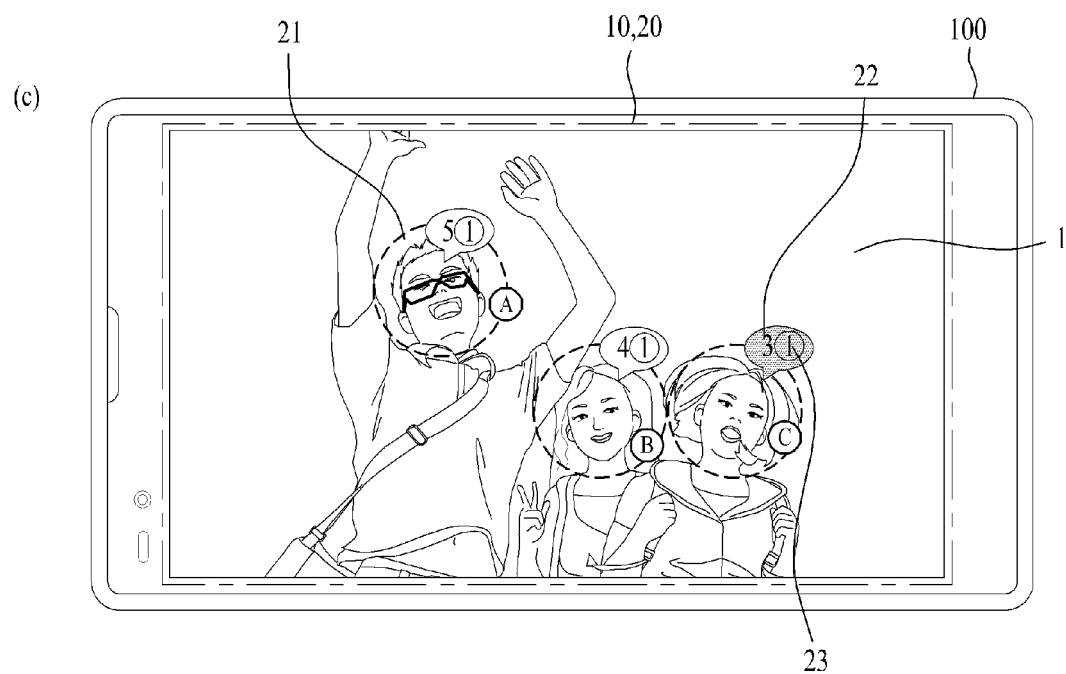

FIGS. 2 and 3 are views showing an image sharing interface of the disclosure.

Referring to FIGS. 2 and 3, an image sharing interface 10 may display an image 1 on the display screen of the digital device 100. The image sharing interface 10 is an interface configured to display a stored image or a sensed image. In one example, as shown in FIG. 2, the displayed image 1 may be an image sensed through the camera unit. Consequently, an image displayed on the image sharing interface 10 may be changed based on change in position of the digital device 100. In another example, as shown in FIG. 3, the displayed image 1 may be an image stored in the storage unit.

In addition, referring to FIGS. 2 and 3, an image sharing interface 20 is an interface configured to display the number of capturing and the number of sharing of at least one person recognized from the image 1 and to share the image 1 with the at least one person. The image sharing interface 20 may display an icon 21 indicating at least one recognized person contained in the image 1 on the display screen of the digital device 100, a capturing count indicator 22 indicating the number of capturing the at least one recognized person contained in the image 1, and a sharing count indicator 23 indicating the number of sharing with the at least one recognized person contained in the image 1.

The icon 21 indicating at least one recognized person may be an icon indicating at least one recognized person contained in the image 1 respectively when the at least one recognized person contained in the image 1 is recognized. For example, as shown in FIG. 2a, in a case in which three persons are recognized from the image 1, the digital device 100 may display an icon 21 indicating three persons on the image sharing interface 20.

In addition, the icon 21 indicating at least one person contained in the image 1 may be displayed on the display unit in various fashions. For example, as shown in FIGS. 2a and 2b, the digital device 100 may display an icon 21 indicating at least one recognized person contained in an image as an icon indicating a face of each person. In addition, for example, as shown in FIG. 2c, the digital device 100 may display an icon 21 on the position of a face of at least one person contained in an image in an overlaying fashion. In one example, the digital device may display a dotted line on an outline position of a face of a person as an icon 21.

The capturing count indicator 22 displays the number of capturing which indicates the number of images, stored in the digital device 100, containing at least one person contained in an image displayed on the image display interface 10. That is, the capturing count indicator 22 indicates the number of images, stored in the digital device 100, containing at least one person. In a case in which an image displayed on the image display interface 10 is captured, therefore, the number displayed on the capturing count indicator 22 for at least one person contained in the image may be incremented by 1.

In one embodiment, the number of capturing may be determined based on the number of images stored in the storage unit when the number of capturing is counted. For example, in a case in which the number of images containing person A is 10, the number of capturing person A may be 8 if two images are deleted from the images before the number of capturing is counted. In another embodiment, in a case in which at least some of images stored in the storage unit are deleted, the number of capturing may be decided based on the number of the images stored in the storage unit before the at least some of the images stored in the storage unit are deleted. For example, in a case in which the number of images containing person A is 10, the number of capturing person A may be 10 even if two images are deleted from the images before the number of capturing is counted.

The sharing count indicator 23 displays the number of sharing which indicates the number of images, stored in the digital device 100, transmitted to at least one recognized person contained in the image 1 displayed on the image display interface 10. That is, the sharing count indicator 23 indicates the number of transmitting images, stored in the digital device 100, containing at least one person to the corresponding person. In a case in which the image 1 displayed on the image display interface 10 is transmitted to at least one person contained in the image, therefore, the number displayed on the sharing count indicator 23 for at least one person contained in the image may be incremented by 1.

In one embodiment, the number of sharing may be decided based on the number of images stored in the storage unit when the number of sharing is counted. For example, in a case in which the number of images containing person A is 10, the number of shared images is 5, and two images are deleted from the shared images before the number of times of sharing is counted, the number of sharing with person A may be 3. In another embodiment, in a case in which images transmitted to at least one recognized person are deleted from images stored in the storage unit, the number of sharing may be decided based on the number of the images stored in the storage unit before the transmitted images are deleted. For example, in a case in which the number of images containing person A is 10, the number of shared images is 5, and two images are deleted from the shared images before the number of sharing is counted, the number of sharing with person A may be 5.

Meanwhile, the capturing count indicator 22 and the sharing count indicator 23 may be displayed adjacent to each other in the image sharing interface 20. Referring to FIG. 2A, the digital device 100 may display a capturing count indicator 22 (3) and a sharing count indicator 23 (1) of person C together at the lower end of the image sharing interface 20. In this case, one selected from between the capturing count indicator 22 and the sharing count indicator 23 may be displayed as a circled number to distinguish between the capturing count indicator 22 and the sharing count indicator 23. Besides, the capturing count indicator 22 and the sharing count indicator 23 may be displayed in various fashions.

In addition, the capturing count indicator 22 and the sharing count indicator 23 may be displayed adjacent to the icon 21. For example, as shown in FIGS. 2 and 3, the capturing count indicator 22 and the sharing count indicator 23 may be displayed above the right side of the icon.

An image capturing trigger 30 enables a user to capture the image 1 displayed on the image display interface 10. That is, upon detecting a user input signal to the image capturing trigger 30, the digital device 100 may capture the image displayed on the image display interface 10. The image capturing trigger 30 is necessary to capture an image. For this reason, the image capturing trigger 30 may be provided in embodiments for image capturing.

FIGS. 2a to 2c are views showing an image display interface 10, an image sharing interface 20, and an image capturing trigger 30 in a case in which the digital device 100 captures an image.

In one embodiment, the digital device 100 may display an icon 21, a capturing count indicator 22, and a sharing count indicator 23 in different regions before and after an image 1 is shared. For example, the digital device 100 may display an icon 21, a capturing count indicator 22, and a sharing count indicator 23 of at least one person recognized from an image sensed through the camera unit at the upper end of the image sharing interface 20 before the image is shared. In addition, the digital device 100 may display the icon 21, the capturing count indicator 22, and the sharing count indicator 23 of the person at the lower end of the image sharing interface 20 after the image is shared. Conversely, the digital device 100 may display the icon and the indicators at the lower end of the image sharing interface 20 before the image is shared and at the upper end of the image sharing interface 20 after the image is shared. Alternatively, the digital device 100 may display the icon and the indicators at the left side and the right side thereof. Moreover, the digital device 100 may display the icon and the indicators in two different regions, which are not particularly restricted, depending upon before and after the image is shared.

That is, referring to FIG. 2a, the digital device 100 may display icons 21 of persons A and B and capturing count indicators 22 of the respective persons at the upper end thereof before an image is shared. In FIG. 2a, a sharing count indicator 23 is not displayed at the upper end of the digital device 100 since no image shared with persons A and B is present. In addition, referring to FIG. 2a, the digital device 100 may display an icon 21, a capturing count indicator 22, and a sharing count indicator 23 of person C at the lower end thereof, through which a user may confirm that an image is captured and, at the same time, the image is shared with person C.

In another embodiment, the digital device 100 may display an icon 21, a capturing count indicator 22, and a sharing count indicator 23 at the same region thereof irrespective of before and after an image 1 is shared. For example, the digital device 100 may display an icon 21, a capturing count indicator 22, and a sharing count indicator 23 of at least one person contained in the image at one selected from among the upper end, the lower end, the left side, and the right side of the display unit. That is, the digital device 100 may simultaneously display the capturing count indicator 22 and the sharing count indicator 23 irrespective of whether the image 1 is shared.

In this case, different graphical effects may be applied to the capturing count indicator 22 and the sharing count indicator 23 before updated and to the capturing count indicator 22 and the sharing count indicator 23 after updated to distinguish between whether an image is shared. For example, the digital device 100 may display the capturing count indicator 22 and the sharing count indicator 23 after updated using a color different from that of the capturing count indicator 22 and the sharing count indicator 23 before updated. Referring to FIG. 2b, persons A and B do not share the image displayed on the image display interface 10 and person C shares the image displayed on the image display interface 10.

Also, in another embodiment, the digital device 100 may display an icon 21, a capturing count indicator 22, and a sharing count indicator 23 adjacent to the position of a face of a person recognized from an image displayed on the image sharing interface 20. Referring to FIG. 2c, the digital device 100 may display a capturing count indicator 22 and a sharing count indicator 23 beside faces of persons A, B, and C recognized from the displayed image. In this case, an icon 21 of at least one person may correspond to a dotted line surrounding the faces of persons A, B, and C recognized from the image 1. In addition, in FIG. 2c, different graphical effects may be applied to distinguish between whether the displayed image is shared. That is, person C of FIG. 2c shares the image. Consequently, the capturing count indicator 22 and the sharing count indicator 23 of person C may be displayed using a color different from that of the capturing count indicators and the sharing count indicators of the other person.

FIGS. 3a to 3c are views showing an image display interface 10 and an image sharing interface 20 in a case in which an image stored in the digital device 100 is displayed.

In one embodiment, the digital device 100 may display an icon 21, a capturing count indicator 22, and a sharing count indicator 23 of at least one person recognized from an image at the upper end of the image sharing interface 20 before the image is shared, similarly to FIG. 2a. In addition, the digital device 100 may display an icon 21, a capturing count indicator 22, and a sharing count indicator 23 of a person sharing the image at the lower end of the image sharing interface 20 after the image is shared.

Referring to FIG. 3*a*, the digital device 100 may display icons 21, capturing count indicators 22, and sharing count indicators 23 of persons A and B do not sharing a currently displayed image at the upper end of the image display interface 20. In addition, the digital device 100 may display an icon 21, a capturing count indicator 22, and a sharing count indicator 23 of person C sharing the currently displayed image at the lower end of the image display interface 20.

In another embodiment, the digital device 100 may display an icon 21, a capturing count indicator 22, and a sharing count indicator 23 of at least one person contained in an image at one selected from among the upper end, the lower end, the left side, and the right side of the display unit, similarly to FIG. 2*b*. That is, the digital device 100 may simultaneously display the capturing count indicator 22 and the sharing count indicator 23 irrespective of whether the image is shared. In this case, however, the digital device 100 may display the indicators before updated and the indicators after updated using different colors or shapes to distinguish between whether the indicators are updated. Referring to FIG. 3*b*, persons A and B do not share the image displayed on the image display interface 10 and person C shares the image displayed on the image display interface 10.

Also, in another embodiment, the digital device 100 may display an icon 21, a capturing count indicator 22, and a sharing count indicator 23 adjacent to the position of a face of a person recognized from an image displayed on the image sharing interface 20, similarly to FIG. 2*c*. In this case, however, the digital device 100 may display the indicators before updated and the indicators after updated using different colors or shapes to distinguish between whether the indicators are updated. Referring to FIG. 3*c*, the digital device 100 may display a capturing count indicator 22 and a sharing count indicator 23 beside faces of persons A, B, and C recognized from the displayed image. In this case, an icon 21 of at least one person may correspond to a dotted line surrounding the faces of persons A, B, and C.

Figure 4:
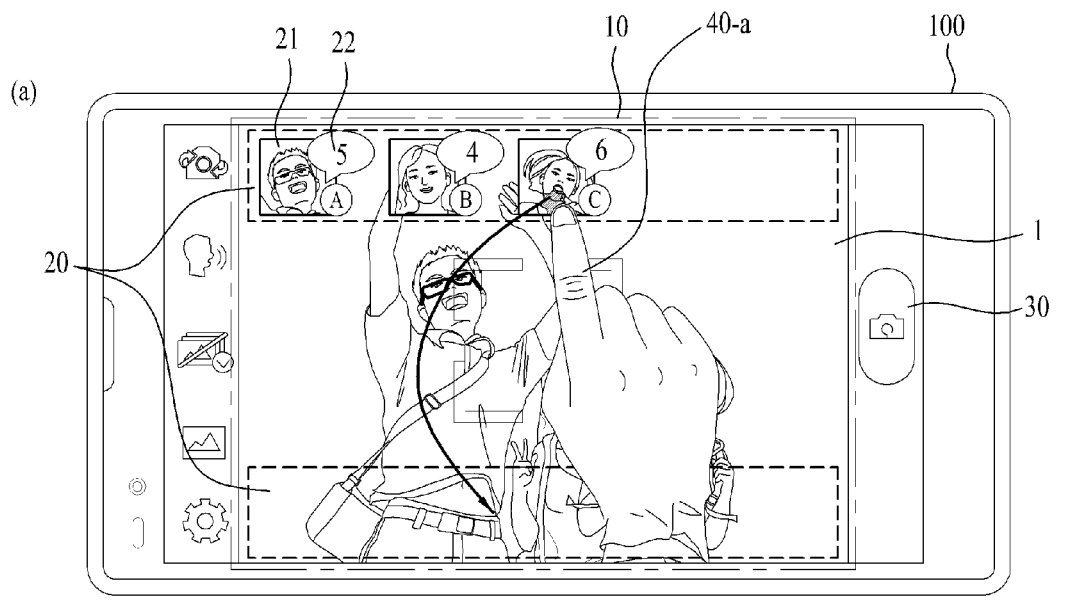
FIGS. 4a to 4d are views showing a first embodiment of a method of sharing an image with at least one person contained in the image of the disclosure.
Figure 4:
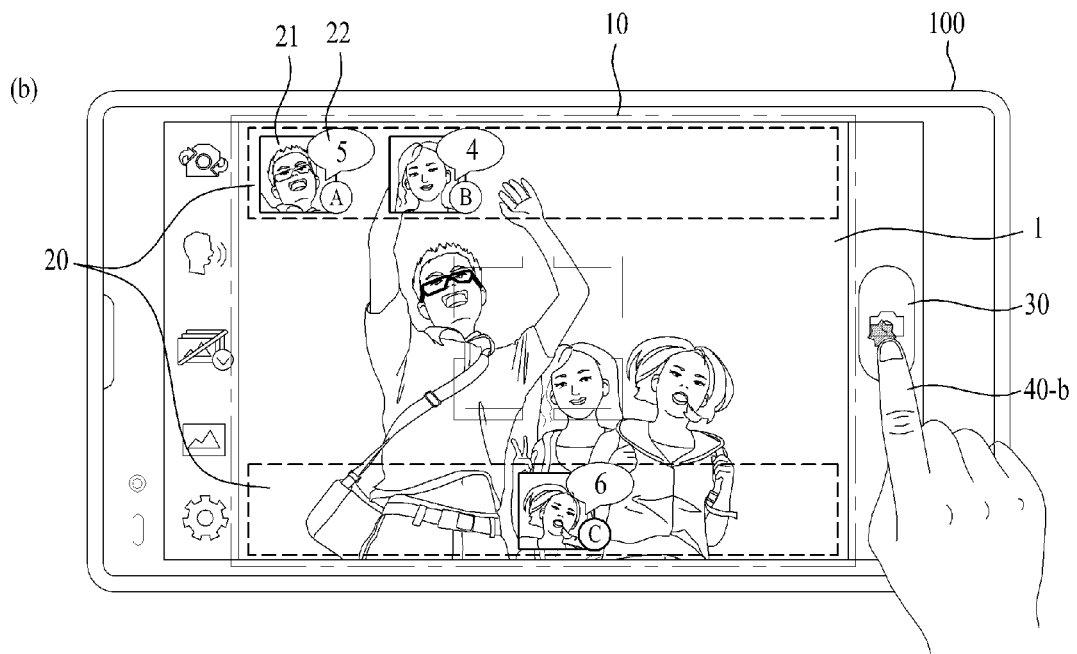
Figure 5:
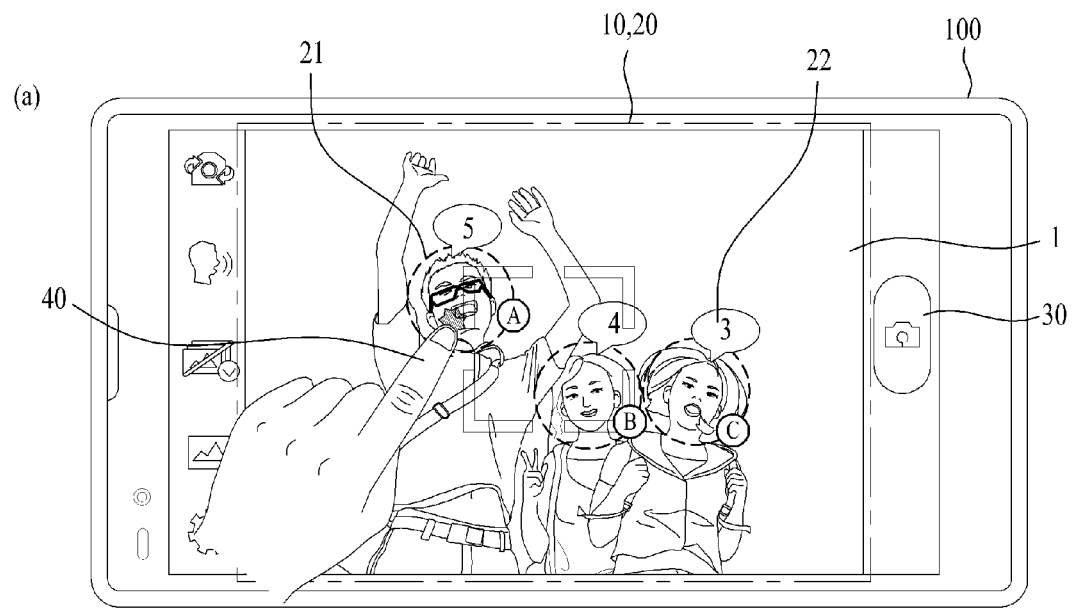
FIGS. 5a to 5c are views showing a second embodiment of a method of sharing an image with at least one person contained in the image of the disclosure.
Figure 5:
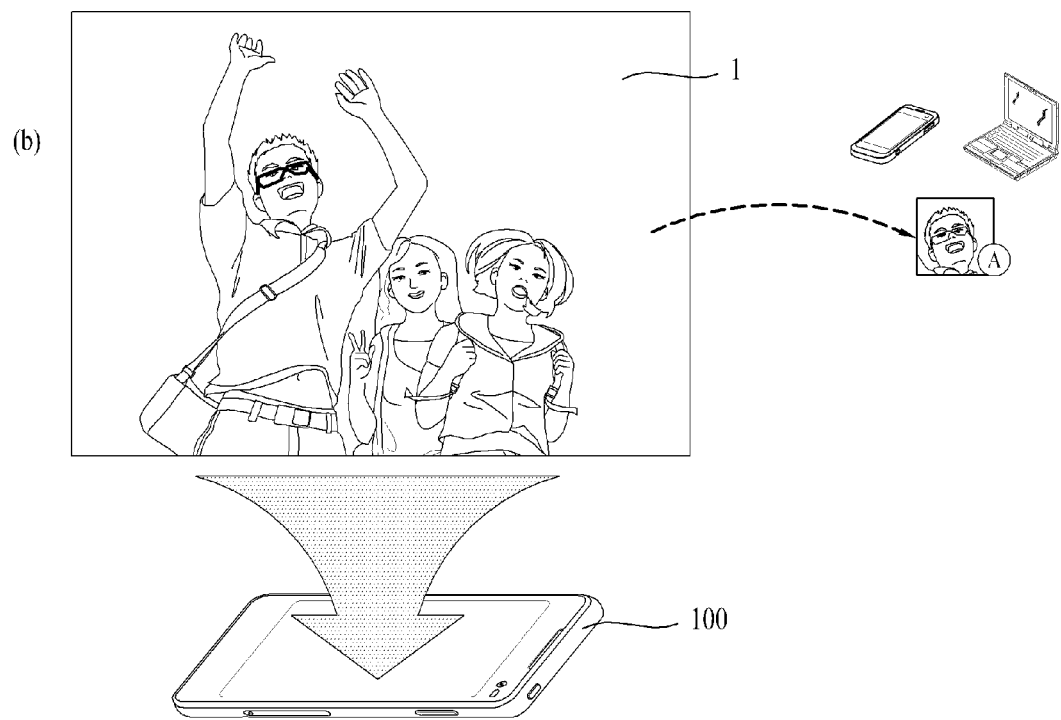
Figure 5:
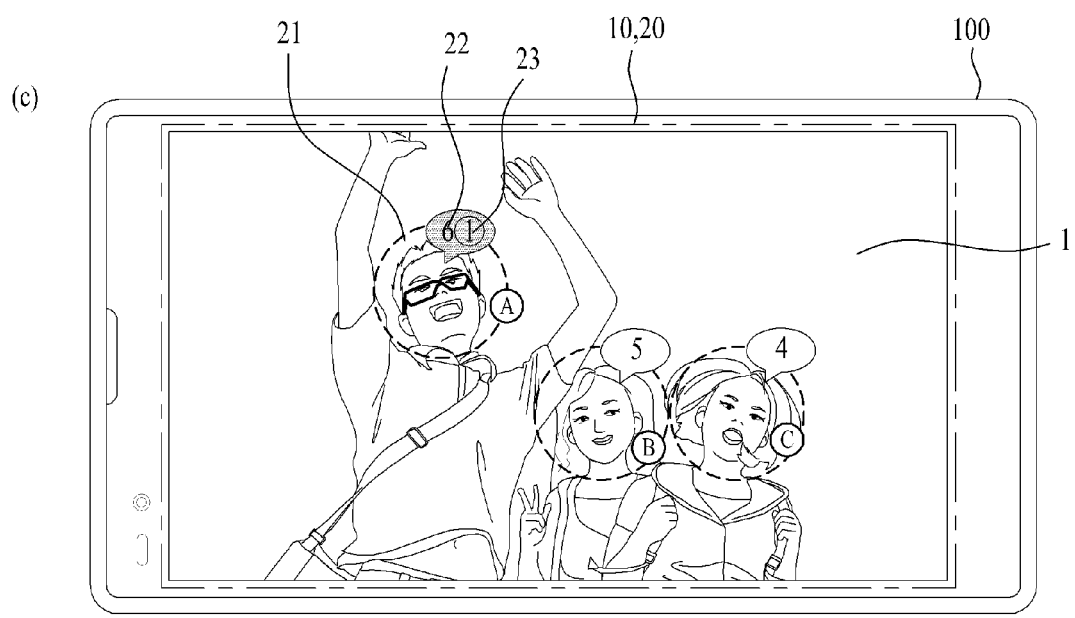
Figure 6:
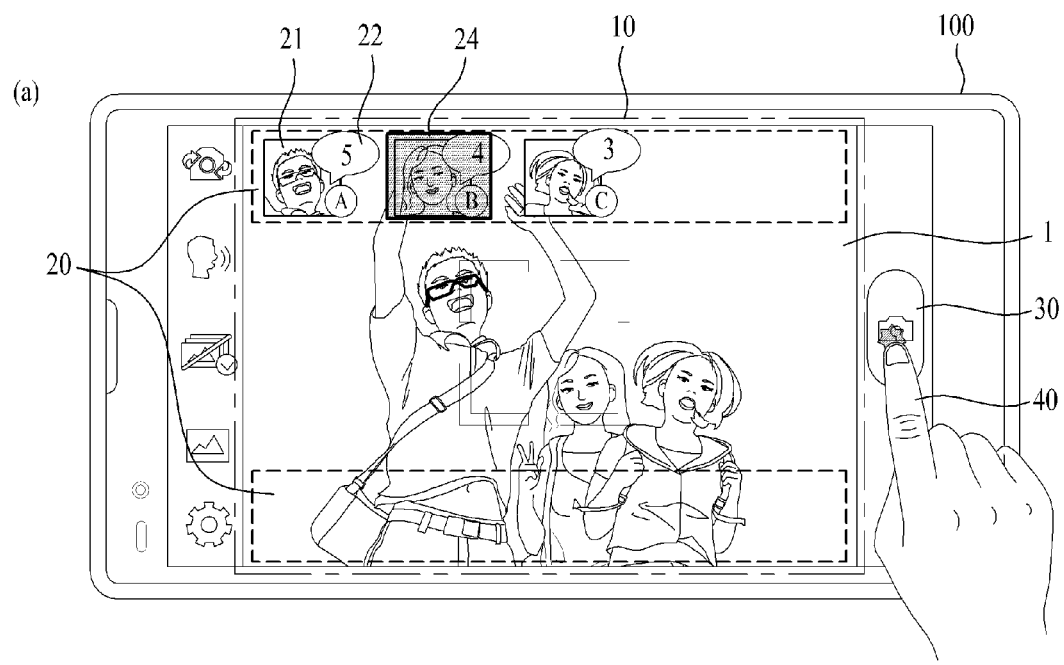
FIGS. 6a to 6c are views showing a third embodiment of a method of sharing an image with at least one person contained in the image of the disclosure.
Figure 6:
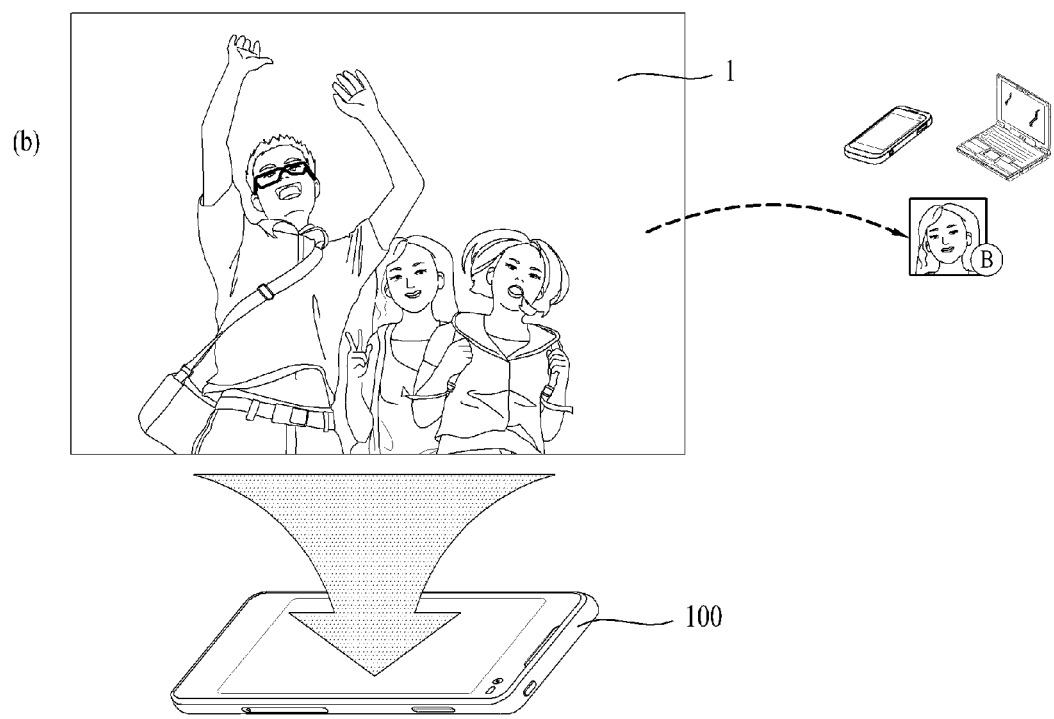
Figure 6:
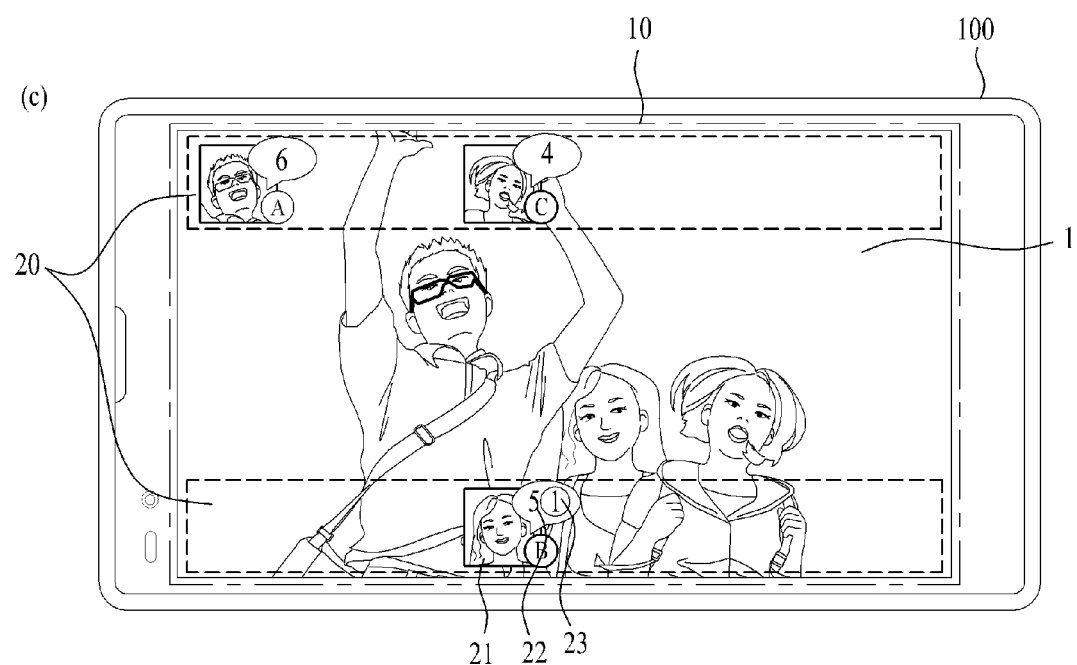

FIGS. 4 to 6 are views showing embodiments of a method of sharing an image sensed through the camera unit with at least one person contained in the image in a case in which the image is captured.

FIG. 4 is a view showing a first embodiment of a method of sharing an image with at least one person contained in the image of the disclosure. More specifically, FIGS. 4*a* to 4*d* show capturing a displayed image 1 and sharing the image with at least one person contained in the image 1.

First, as shown in FIG. 4*a*, the digital device 100 may display an image 1 sensed by the camera unit on an image display interface 10. As previously described with reference to FIG. 2, the image displayed on the image display interface 10 may correspond to an image sensed through the camera unit in real time. In addition, the digital device 100 may recognize at least one person contained in the image displayed on the image display interface 10.

In addition, the digital device 100 may count the number of capturing, i.e. the number of images, stored in the storage unit, containing at least one person contained in the displayed image 1. Referring to FIG. 4*a*, the digital device 100 may count the number of capturing person A as 5, the number of capturing person B as 4, and the number of capturing person C as 6. In addition, the digital device 100 may count the number of times of sharing, i.e. the number of images, stored in the storage unit, transmitted to an address of at least one person contained in the displayed image 1. Referring to FIG. 4*b*, the digital device 100 may count the number of sharing with persons A, B, and C as 0.

Meanwhile, the digital device 100 may perform the above operations irrespective of order. That is, the digital device 100 may almost simultaneously display the image 1 on the image display interface, recognize at least one person contained in the image 1, and count the number of capturing the at least one recognized person and the number of sharing with the at least one recognized person.

Subsequently, the digital device 100 may simultaneously display the image display interface 10 and an image sharing interface 20. As previously described with reference to FIGS. 2 and 3, the image sharing interface 20 may include an icon 21, a capturing count indicator 22, and a sharing count indicator 23 indicating at least one person contained in the image. Referring to FIG. 4*a*, the digital device 100 may display icons 21 and capturing count indicators 22 of persons A, B, and C on the image sharing interface 20. Not displaying of sharing count indicators 23 may mean that no stored images transmitted to persons A, B, and C are present.

Subsequently, as shown in FIG. 4*a*, the digital device 100 may detect a first input signal 40-*a* to an icon 21 indicating at least one person. The first input signal 40-*a* may be a user input signal. The first input signal 40-*a* may include a touch input, a drag input, and a hovering input. In FIG. 4A, the digital device 100 may detect a drag input to move an icon 21 indicating person A to the lower end of the image display interface 10.

Subsequently, as shown in FIG. 4*n*, the digital device 100 may move an icon 21 corresponding to the detected first input signal 40-*a* to the lower end of the image display interface 10 based on the detected first input signal 40-*a*. In addition, the digital device 100 may move the icon 21 corresponding to the first input signal 40-*a* and a capturing count indicator 22 and a sharing count indicator 23 of a person corresponding to the icon 21 to the lower end thereof. In FIG. 4*b*, an icon 21 indicating person C is moved to the lower end of the image sharing interface 20 to indicate that the image 1 displayed on the image display interface 10 will be transmitted to an address of person C. FIG. 4*b* shows that the image is transmitted to person C. In a case in which the image is desired to be transmitted to a plurality of persons, however, icons of the other persons may be moved to the lower end of the image sharing interface 20 before the image is captured.

Subsequently, as shown in FIG. 4*b*, the digital device 100 may detect a second input signal 40-*b* to an image capturing trigger 30. The second input signal 40-*b* may be a user input signal. The second input signal 40-*b* may include a touch input, a hovering input, and a voice input. In FIG. 4*b*, the digital device 100 may detect a touch input of a user 40 to the image capturing trigger 30.

The digital device 100 may capture the image 1 displayed on the image display interface 10 based on the input signal to the image capturing trigger 30. In addition, the digital device 100 may store the captured image. In addition, the digital device 100 may transmit the captured image to an address of a person who is scheduled to share the captured image. In FIG. 4*c*, the digital device 100 may transmit the captured image 1 to an address of person C who is scheduled to share the captured image. The address of person C may correspond to an email address used by person C or an IP address of a device owned by person C.

In addition, the digital device 100 may display the captured image on the image display interface 10 based on the input signal to the image capturing trigger 30. In addition, the digital device 100 may display the captured image and, at the same time, display an updated capturing count indicator 22 and an updated sharing count indicator 23 on the image sharing interface 20. This corresponds to preview display to inform the user 40 that the image is captured and shared. In FIG. 4d, the image is captured and, at the same time, is transmitted to person C. Consequently, the digital device 100 increments the capturing count indicator 22 and the sharing count indicator 23 by 1 and displays the incremented capturing count indicator 22 and the incremented sharing count indicator 23. On the other hand, the image is captured but is not transmitted to persons A and B. Consequently, the digital device 100 increments the capturing count indicators 22 by 1 and displays the incremented capturing count indicators 22.

FIG. 5 is a view showing a second embodiment of a method of sharing an image with at least one person contained in the image of the disclosure. More specifically, FIGS. 5a to 5c show capturing a displayed image 1 and sharing the captured image 1 with at least one person contained in the image. A description of processes of FIG. 5 identical to those of FIG. 4 will be omitted.

The digital device 100 may simultaneously display an image display interface 10 and an image sharing interface 20. The image sharing interface 20 of FIG. 5 may display an icon 21, a capturing count indicator 22, and a sharing count indicator 23 adjacent to a face contained in the image 1 as previously described with reference to FIG. 2C. Referring to FIG. 5a, the digital device 100 may display dotted icons 21 and capturing count indicators 22 of persons A, B, and C on the image sharing interface 20. Not displaying of sharing count indicators 23 may mean that no images, stored in the storage unit, transmitted to persons A, B, and C are present.

Subsequently, as shown in FIG. 5a, the digital device 100 may detect an input signal 40 to an icon 21 indicating at least one person. More specifically, the digital device 100 may detect an input signal 40 of a user to a dotted icon 21 indicating a person contained in the image. For example, in FIG. 5a, an input signal 40 of a user to an icon 21 of person A may correspond to a touch input. In addition, in FIG. 5a, an input signal 40 of a user to an icon 21 may correspond to an input signal to capture an image 1 and to transmit the captured image 1 to person A.

Subsequently, the digital device 100 may capture the image 1 displayed on the image display interface 10 based on the detected input signal 40. In addition, the digital device 100 may store the captured image 1. In addition, the digital device 100 may transmit the captured image 1 to an address of a person indicated by the icon 21 corresponding to the input signal 40. In FIG. 5b, the digital device 100 may store the captured image 1 and transmit the captured image 1 to an address of person A.

Meanwhile, the digital device 100 may display the captured image 1 on the image display interface 10 based on the detected input signal. In addition, the digital device 100 may display an updated capturing count indicator 22 and an updated sharing count indicator 23 on the image sharing interface 20. Consequently, the user may recognize that the displayed image is captured and shared with a selected person.

In FIG. 5c, the image is captured and, at the same time, is transmitted to person A. Consequently, the digital device 100 increments the capturing count indicator 22 and the sharing count indicator 23 of person A by 1 as compared with FIG. 5a and displays the incremented capturing count indicator 22 and the incremented sharing count indicator 23. On the other hand, the image is captured but is not transmitted to persons B and C. Consequently, the digital device 100 increments the capturing count indicators 22 by 1 as compared with FIG. 5a and displays the incremented capturing count indicators 22. In FIG. 5c, the capturing count indicator 22 and the sharing count indicator 23 of person A provide different visual effects from the capturing count indicators 22 and the sharing count indicators 23 of persons B and C. The user may easily distinguish between before the image is shared and after image is shared through such visual effects.

In this embodiment, image capturing and image sharing may be simultaneously performed through only one user input.

FIG. 6 is a view showing a third embodiment of a method of sharing an image with at least one person contained in the image of the disclosure. More specifically, FIGS. 6a to 6c show a case in which a captured image is transmitted to a predetermined person 24. A description of processes of FIG. 6 identical to those of FIG. 4 will be omitted.

Before capturing an image, the digital device 100 may set at least one person contained in an image 1 as a predetermined person. For example, the digital device 100 may set a specific person before capturing an image as a predetermined person 24 according to user setting. The predetermined person 24 indicate a person to an address of whom, when an image is captured, the captured image is automatically transmitted. Referring to FIG. 6a, the digital device 100 may set person B as the predetermined person 24 on the image sharing interface 20. In addition, as shown in FIG. 6a, the digital device 100 may provide an icon and indicators of the predetermined person 24 with a graphical effect different from that of icons and indicators of the other persons to distinguish between the predetermined person 24 and the other persons.

The digital device 100 may display an image display interface 10 and the image sharing interface 20. Subsequently, as shown in FIG. 6a, the digital device 100 may detect an input signal 40 to an image capturing trigger 30. The input signal 40 to an image capturing trigger 30 may correspond to a touch input of a user.

Subsequently, the digital device 100 may capture the image displayed on the image display interface 10 based on the detected input signal 40 to the image capturing trigger 30. In addition, the digital device 100 may store the captured image 1. Meanwhile, the digital device 100 may transmit the captured image to an address of the predetermined person 24. As shown in FIG. 6b, person B is set as the predetermined person. Consequently, the digital device 100 may transmit the captured image to an address of person B.

On the other hand, the digital device 100 may display the captured image on the image display interface 10 based on the input signal to the image capturing trigger 30. In addition, the digital device 100 may display an updated capturing count indicator 22 and an updated sharing count indicator 23 on the image sharing interface 20.

In FIG. 6c, the image is captured and, at the same time, is transmitted to person B. Consequently, the digital device 100 increments the capturing count indicator 22 and the sharing count indicator 23 by 1 and displays the incremented capturing count indicator 22 and the incremented sharing count indicator 23. In addition, the digital device 100 displays the icon 21, the capturing count indicator 22, and the sharing count indicator 23 of person B at the lower end of the image sharing interface 20 to indicate that the image is shared with person B. In FIG. 6c, on the other hand, an image containing persons A and C is captured but is not shared with persons A and C. Consequently, the digital device 100 increments the capturing count indicators 22 by 1 and displays the incremented capturing count indicators 22 at the upper end of the image sharing interface 20

In this embodiment, image capturing and image sharing may be simultaneously performed through only one user input in a case in which the digital device sets a predetermined person.

Figure 7:
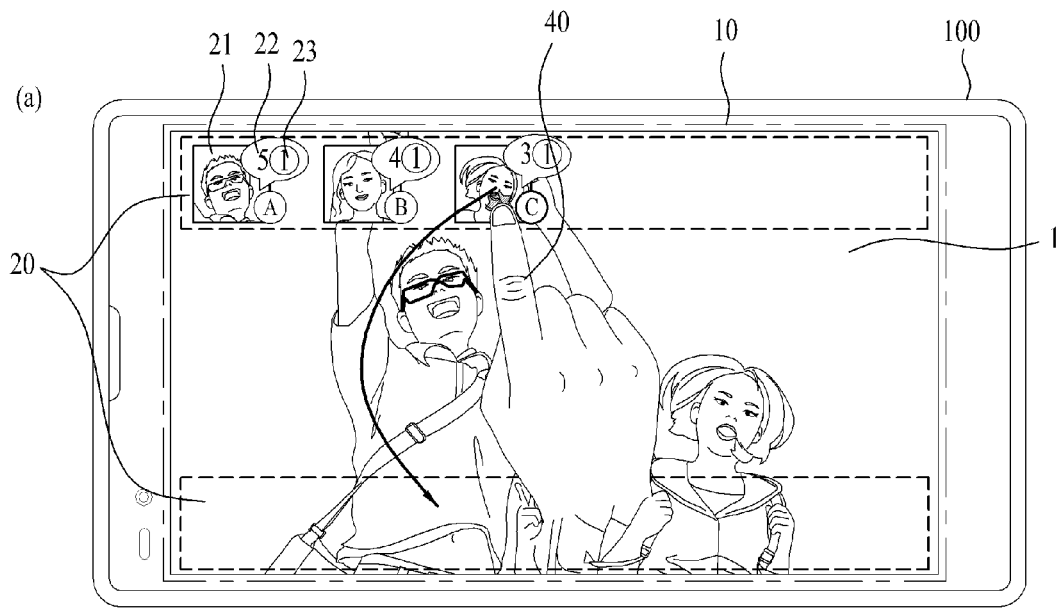
FIGS. 7a to 7c are views showing a fourth embodiment of a method of sharing an image with at least one person contained in the image of the disclosure.
Figure 7:
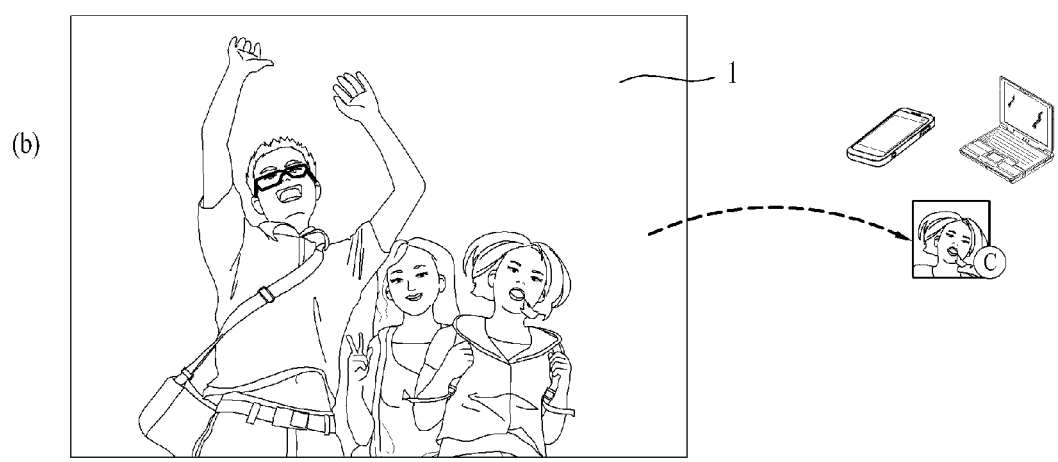
Figure 7:
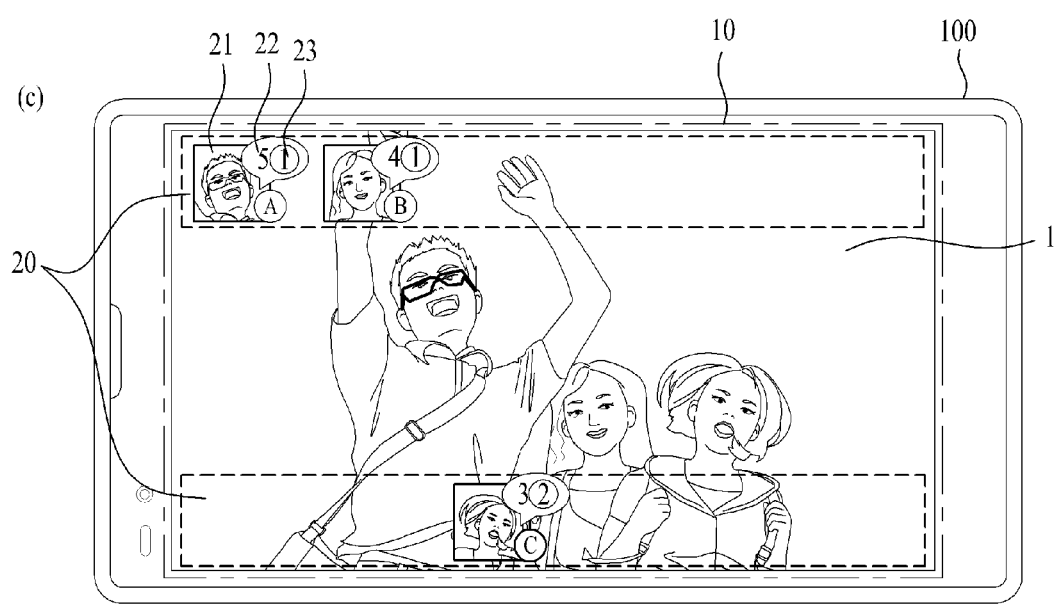

FIG. 7 is a view showing a fourth embodiment of a method of sharing an image with at least one person contained in the image of the disclosure. More specifically, FIGS. 7a to 7c show sharing a displayed image with at least one person contained in the image.

First, the digital device 100 may display one of images stored in the storage unit. An image displayed on an image display interface 10 may correspond to an image selected from among a plurality of images stored in the storage unit according to user selection. In addition, the digital device 100 may recognize at least one person contained in the image displayed on the image display interface 10.

In addition, the digital device 100 may count the number of capturing, i.e. the number of images, stored in the storage unit, containing at least one person contained in the displayed image. In addition, the digital device 100 may count the number of sharing, i.e. the number of images, stored in the storage unit, transmitted to an address of at least one person contained in the displayed image.

Subsequently, the digital device 100 may simultaneously display the image display interface 10 and an image sharing interface 20 on the display unit. As previously described with reference to FIG. 3, the image sharing interface 20 may include an icon 21 of at least one person contained in the displayed image, a capturing count indicator 22 indicating the number of capturing, and a sharing count indicator 23 indicating the number of sharing. Referring to FIG. 7a, the digital device 100 may display icons 21, capturing count indicators 22, and sharing count indicators 23 of persons A, B, and C contained in the displayed image at the upper end of the image sharing interface 20.

Subsequently, referring to FIG. 7a, the digital device 100 may detect an input signal 40 to image sharing interface 20. More specifically, the digital device 100 may detect an input signal 40 to an icon 21 indicating at least one person. The input signal 40 may be a user input signal. The input signal 40 may include a touch input, a drag input, and a hovering input. In FIG. 7a, the user input signal 40 may correspond to a drag input to move an icon 21 indicating person C to the lower end of the image sharing interface 20.

Subsequently, the digital device 100 may transmit the displayed image to an address of a person indicated by an icon 21 corresponding to the input signal 40 based on the detected input signal 40. In FIG. 7b, the digital device 100 may transmit the displayed image 1 to an address of person C corresponding to the input signal.

In addition, the digital device 100 may display the sharing result of the displayed image on the image sharing interface 20. More specifically, the digital device 100 may transmit the image 1 to an address of a person corresponding to the icon 21 and, at the same time, display an updated sharing count indicator 23 of the corresponding person. Referring to FIG. 7c, the digital device 100 may display a sharing count indicator indicating the updated number of sharing with person C at the lower end of the image sharing interface 20.

Figure 8:
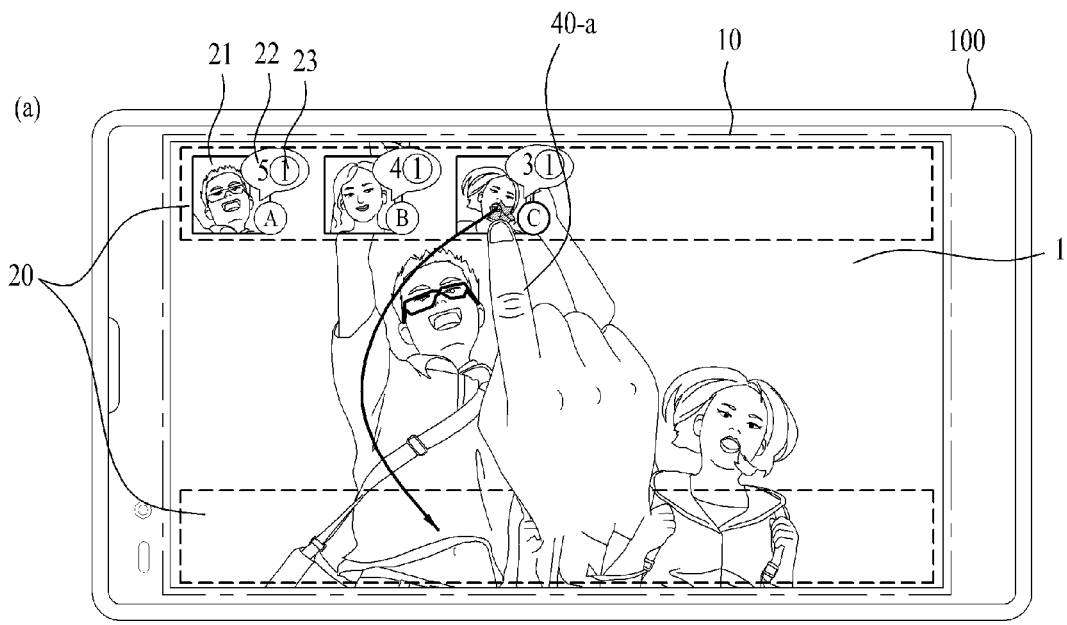
FIGS. 8a to 8d are views showing a fifth embodiment of a method of sharing an image with at least one person contained in the image of the disclosure.
Figure 8:
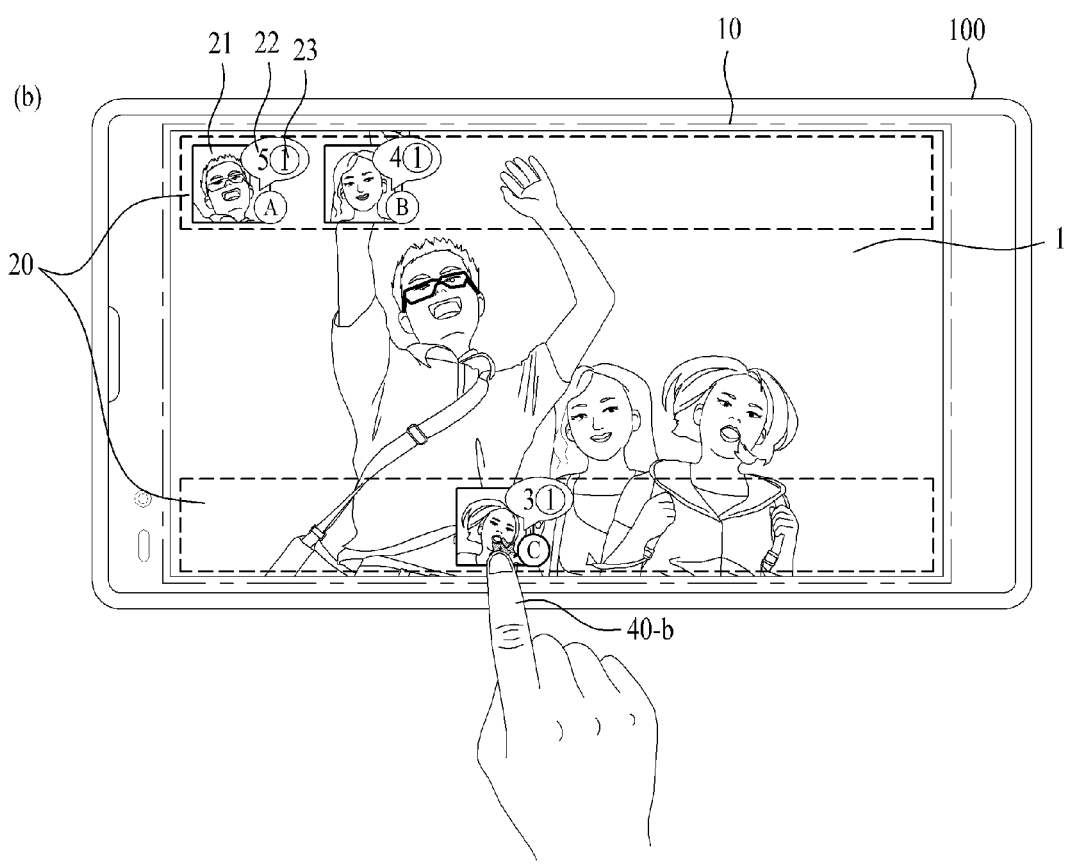
Figure 8:
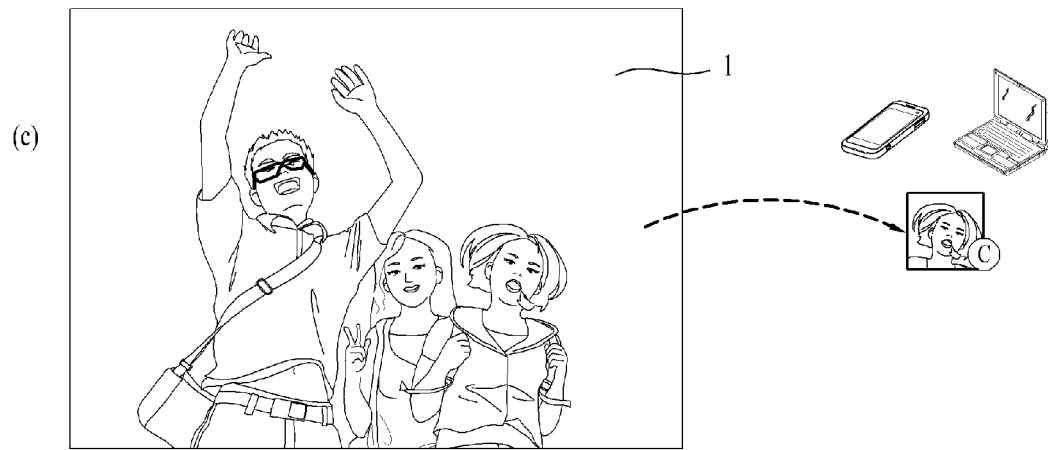
Figure 8:
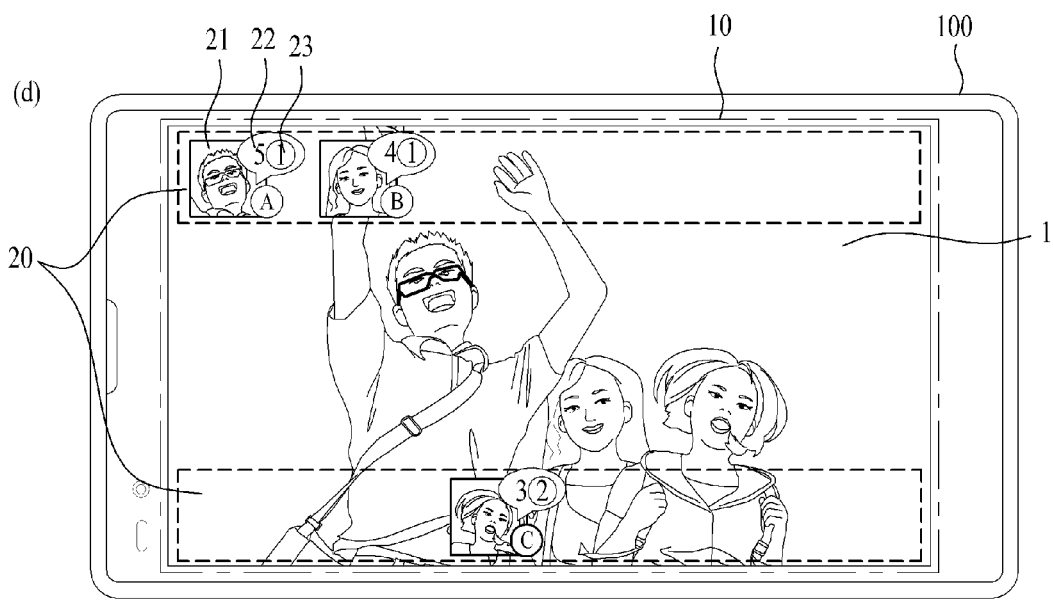

FIG. 8 is a view showing a fifth embodiment of a method of sharing an image with at least one person contained in the image of the disclosure. More specifically, FIGS. 8a to 8d show sharing a displayed image with at least one person contained in the image. A description of processes of FIG. 8 identical to those of FIG. 7 will be omitted.

The digital device 100 may display an image display interface 10 and an image sharing interface 20 on the display unit. As previously described with reference to FIG. 3, the image sharing interface 20 may include an icon 21 of at least one recognized person contained in the displayed image, a capturing count indicator 22 indicating the number of capturing, and a sharing count indicator 23 indicating the number of sharing. Referring to FIG. 8a, the digital device 100 may display icons 21, capturing count indicators 22, and sharing count indicators 23 of persons A, B, and C contained in the displayed image at the upper end of the image sharing interface 20.

Subsequently, referring to FIG. 8a, the digital device 100 may detect a first input signal 40-a to the image sharing interface 20. More specifically, the digital device 100 may detect a first input signal 40-a of a user to an icon 21 indicating at least one recognized person. The first input signal to the icon 21 indicating the person may correspond to a signal to select at least one person contained in the displayed image 1. For example, in FIG. 8a, the first input signal 40-a may correspond to a signal to select person C. In addition, the first input signal may include a touch input, a drag input, and a hovering input by the user. For example, in FIG. 8a, the first input signal may correspond to a drag input to drag an icon 21 of person C.

Subsequently, the digital device 100 may move an icon 21 corresponding to the detected first input signal 40-a in the image sharing interface 20 based on the detected first input signal 40-a. Referring to FIG. 8b, the digital device 100 may move an icon 21 of person C, which is located at the upper end of the image sharing interface 20, to the lower end of the image sharing interface 20 in response to the first input signal 40-a, which is a drag input. Moving the icon of person C may indicate that the displayed image 1 is scheduled to be transmitted to an address of person C.

Subsequently, the digital device 100 may detect a third input signal 40-b to the image sharing interface 20. More specifically, the digital device 100 may detect a third input signal 40-b of a user to an icon 21 indicating at least one recognized person, to which the first input signal is detected. The third input signal 40-b to the icon 21, to which the first input signal is detected, may correspond to a signal to transmit the displayed image 1 to an address of a person corresponding to the icon 21. In addition, in FIG. 8B, the third input signal may correspond to a touch input to an icon 21 of person C.

Subsequently, referring to FIG. 8c, the digital device 100 may transmit the displayed image 1 to an address of a person corresponding to the icon, to which the first input signal is detected, based on the detected third input signal 40-b. Meanwhile, referring to FIG. 8d, the digital device 100 may display the sharing result of the displayed image 1 on the image sharing interface 20. More specifically, the digital device 100 may transmit the image to an address of a person corresponding to the icon 21 and, at the same time, display an updated sharing count indicator 23 of the corresponding person. Referring to FIG. 8d, the digital device 100 may display a sharing count indicator indicating the updated number of sharing with person C at the lower end of the image sharing interface 20.

Figure 9:
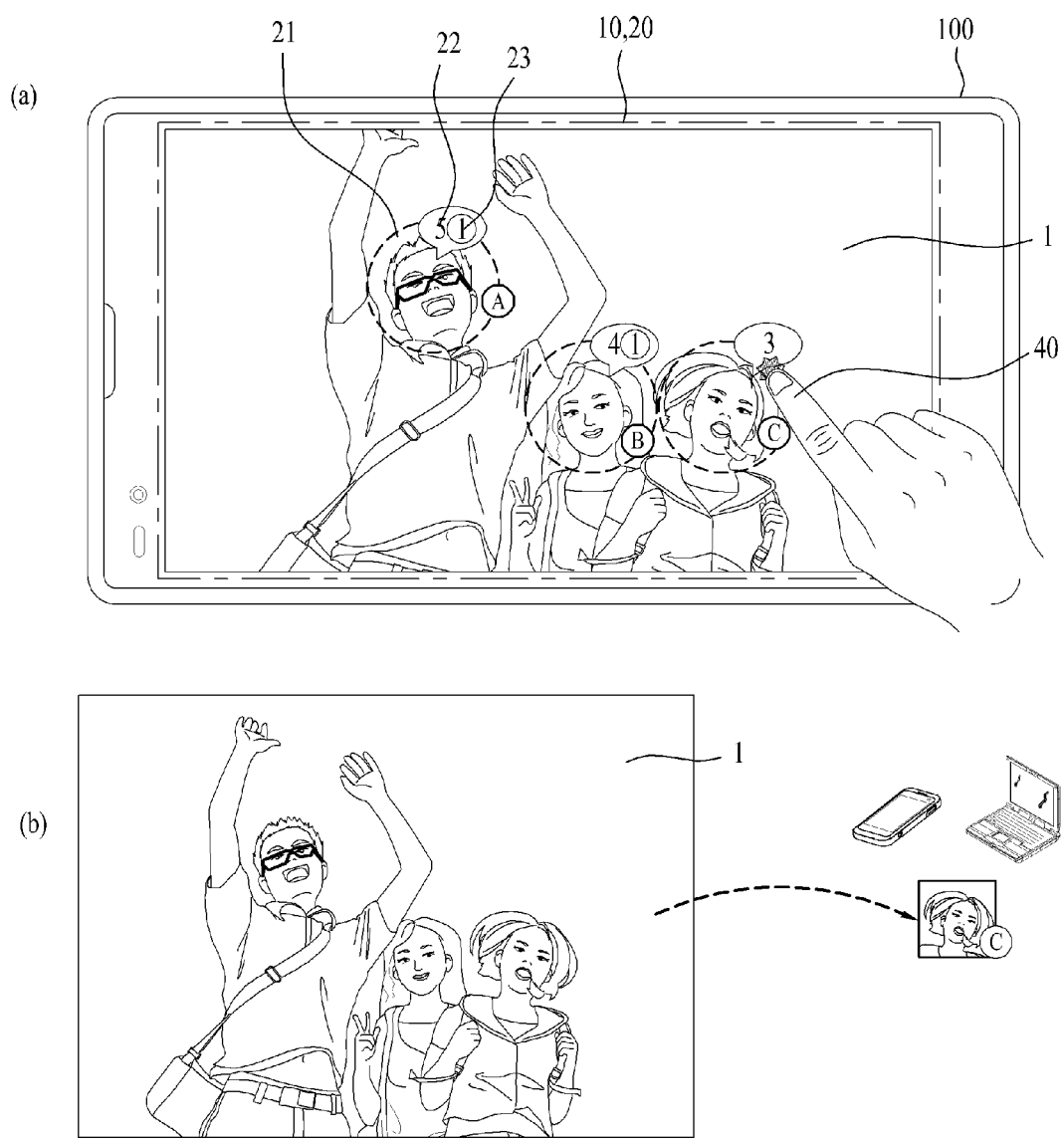
FIGS. 9a to 9c are views showing a sixth embodiment of a method of sharing an image with at least one person contained in the image of the disclosure.
Figure 9:
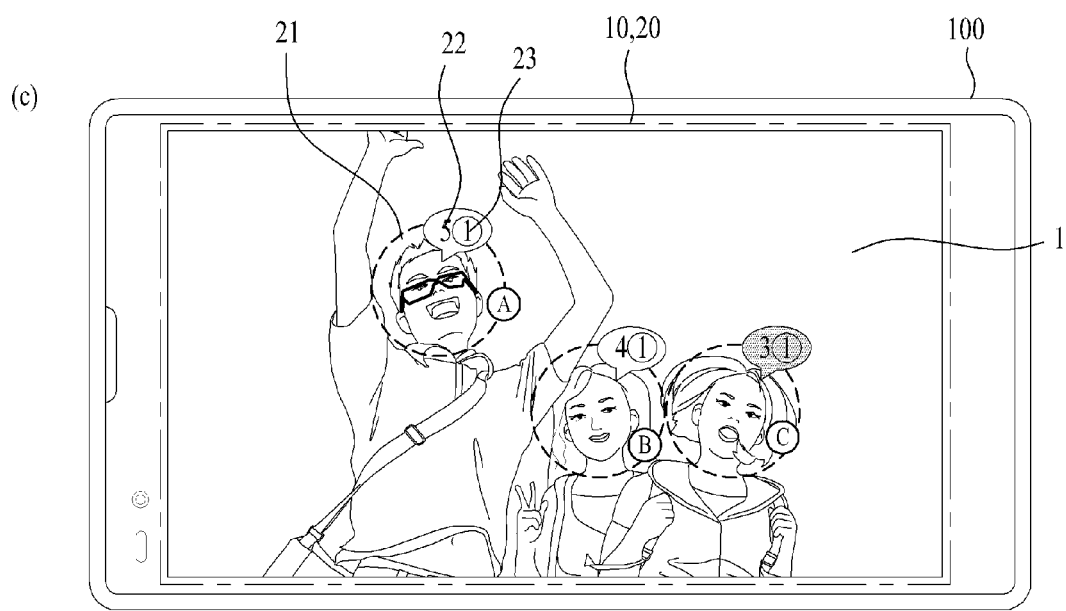

FIG. 9 is a view showing a sixth embodiment of a method of sharing an image with at least one person contained in the image of the disclosure. More specifically, FIGS. 9a to 9d show sharing a displayed image with at least one person contained in the image in a case in which a stored image is shared. A description of processes of FIG. 9 identical to those of FIG. 7 will be omitted.

The digital device 100 may simultaneously display an image display interface 10 and an image sharing interface 20 on the display unit. Referring to FIG. 9a, the digital device 100 may display icons 21, capturing count indicators 22, and sharing count indicators 23 of persons A, B, and C adjacent to faces of persons contained in the image sharing interface 20.

Subsequently, referring to FIG. 9a, the digital device 100 may detect an input signal 40 to image sharing interface 20. More specifically, the digital device 100 may detect a user input signal 40 to an icon 21 indicating at least one recognized person. The user input signal 40 to the icon 21 indicating the at least one person may correspond to a signal to transmit the image to a person corresponding to the icon 21. In addition, the user input signal 40 may include a touch input, a hovering input, and a drag input. For example, in FIG. 9a, the user input signal 40 may correspond to a signal to transmit the image to person C.

Subsequently, referring to FIG. 9b, the digital device 100 may transmit the displayed image 1 to an address of a person, to which the input signal is detected, based on the detected input signal 40. Meanwhile, referring to FIG. 9c, the digital device 100 may display the sharing result of the displayed image 1 on the image sharing interface 20. More specifically, the digital device 100 may transmit the image to an address of a person corresponding to the icon 21 and, at the same time, display an updated sharing count indicator 23 of the corresponding person. Referring to FIG. 9c, the digital device 100 may display a sharing count indicator 23 indicating the updated number of sharing with person C adjacent to the position of a face of person C in the image sharing interface 20.

FIG. 10 is a flowchart showing a control method of a digital device of the disclosure. Steps of the control method of FIG. 10, which will hereinafter be described, may be controlled by the processor 160 of the digital device 100 shown in FIG. 1.

First, the digital device may recognize at least one person contained in an image displayed on an image display interface (S1010). As previously described with reference to FIG. 1, the digital device may quantify positions of eyes, a nose, and a mouth of the person contained in the image and may compare the quantified positions with positions of prestored images to recognize a face of the person.

In addition, the digital device may count the number of capturing which indicates the number of images containing the at least one recognized person among stored images (S1020). As previously described with reference to FIGS. 2 and 3, the number of capturing may be the number of images, stored in the storage unit, containing the at least one person when the number of capturing is counted. In addition, in a case in which at least some of images stored in the storage unit are deleted, the number of capturing may be the number of the images, stored in the storage unit, containing at least one person, before the at least some of the images stored in the storage unit are deleted.

In addition, the digital device may count the number of sharing which indicates the number of images transmitted to an address of the at least one recognized person among stored images (S1030). As previously described with reference to FIGS. 2 and 3, the number of sharing may be the number of images, stored in the storage unit, transmitted to an address of the at least one person when the number of sharing is counted. In addition, in a case in which images transmitted to an address of the at least one person are deleted from images stored in the storage unit, the number of sharing may be the number of the images transmitted to the address of the at least one person before the images transmitted to the address of the at least one person are deleted. Meanwhile, step S1020 and step S1030 may be performed in regular order or in reverse order. Alternatively, step S1020 and step S1030 may be performed simultaneously.

Meanwhile, the digital device may display an image sharing interface (S1040). The image sharing interface may include an icon indicating at least one recognized person contained in an image, a capturing count indicator indicating the number of capturing the at least one recognized person, and a sharing count indicator indicating the number of sharing with the at least one recognized person. As previously described with reference to FIGS. 2 and 3, the capturing count indicator and the sharing count indicator may be displayed adjacent to the icon indicating the at least one person. In addition, as shown in FIGS. 2c and 3c, the icon indicating the at least one person may be displayed on the position of a face of the at least one person recognized from the image in an overlaying fashion.

Subsequently, the digital device may detect a first input signal to the icon indicating the at least one person (S1050). For example, the first input signal may correspond to a signal to select the icon of the at least one person contained in the image. In addition, for example, the first input signal may correspond to a signal to select the at least one person contained in the image, to capture the displayed image, and to transmit the image to an address of the at least one person. In addition, as previously described with reference to FIG. 4, the first input signal may include a touch input, a hovering input, and a drag input.

Subsequently, the digital device may transmit the image to an address of the person corresponding to the icon (S1060). The address may correspond to an email address of the at least one person or an IP address of a device owned by the at least one person. In addition, the address may include various addresses of the least one person, to which the image may be transmitted.

Subsequently, the digital device may display the updated number of sharing on the sharing count indicator of the person corresponding to the icon (S1070). As previously described with reference to FIGS. 2c and 3c, the digital device may provide the sharing count indicator before updated and the sharing count indicator after updated with different graphical effects. Meanwhile, step S1060 and step S1070 may be performed in regular order or in reverse order. Alternatively, step S1060 and step S1070 may be performed simultaneously.

FIG. 11 is a flowchart showing a control method of a digital device of the disclosure. Steps of the control method of FIG. 11, which will hereinafter be described, may be controlled by the processor 160 of the digital device 100 shown in FIG. 1. A detailed description of parts of the embodiment of FIG. 11 identical to or corresponding to those of the embodiment of FIG. 10 will be omitted.

First, the digital device may recognize at least one person contained in an image displayed on an image display interface (S1110). In addition, the digital device may count the number of capturing which indicates the number of images containing the at least one recognized person among stored images (S1120). In addition, the digital device may count the number of sharing which indicates the number of images transmitted to an address of the at least one recognized person among stored images (S1130).

Subsequently, the digital device may display an image sharing interface (S1140). Subsequently, the digital device may detect a first input signal to an icon indicating the at least one recognized person (S1150).

Subsequently, the digital device may detect a second input signal to an image capturing trigger (S1160). As previously described with reference to FIG. 4, the second input signal to the image capturing trigger may correspond to a signal to capture the displayed image and to transmit the captured image to the at least one person corresponding to the icon, to which the first input signal is detected.

Subsequently, the digital device may transmit the image to an address of the person corresponding to the icon based on the detected second input signal (S1170).

Meanwhile, the digital device may display the updated number of capturing the at least one recognized person on a capturing counter indicator of the at least one recognized person and the number of sharing on a sharing count indicator of the at least one recognized person corresponding to the icon based on the detected second input signal (S1180). Meanwhile, step S1170 and step S1180 may be performed in reverse order or simultaneously.

FIG. 12 is a flowchart showing a control method of a digital device of the disclosure. Steps of the control method of FIG. 12, which will hereinafter be described, may be controlled by the processor 160 of the digital device 100 shown in FIG. 1. A detailed description of parts of the embodiment of FIG. 12 identical to or corresponding to those of the embodiment of FIG. 10 will be omitted.

First, the digital device may recognize at least one person contained in an image displayed on an image display interface (S1210). In addition, the digital device may count the number of capturing which indicates the number of images containing the at least one recognized person among stored images (S1220). In addition, the digital device may count the number of sharing indicating the number of images transmitted to an address of the at least one recognized person among stored images (S1230).

Subsequently, the digital device may display an image sharing interface (S1240). Subsequently, the digital device may detect a first input signal to an icon indicating the at least one recognized person (S1250). As previously described with reference to FIG. 8, the first input signal may correspond to a signal to select a person to which the image will be transmitted.

Subsequently, the digital device may detect a third input signal to the icon indicating the at least one recognized person, to which the first input signal is detected (S1260). As previously described with reference to FIG. 8, the third input signal may correspond to a signal to transmit the image to the selected person.

Subsequently, the digital device may transmit the image to an address of the person corresponding to the icon based on the detected third input signal (S1270). Subsequently, the digital device may display the updated number of sharing on a sharing count indicator of the person corresponding to the icon (S1280). Step S1270 and step S1280 may be performed simultaneously or in reverse order.

While the disclosure has been described with reference to separate drawings for convenience, a new embodiment may be implemented by combining embodiments illustrated in the drawings. When needed, designing a computer-readable recording medium, in which a program for implementing the afore-described embodiments is recorded, is within the scope of the disclosure.

The digital device and the control method thereof according to the disclosure are not limited to the configurations and methods of the exemplary embodiments set forth herein. The exemplary embodiments may be selectively combined in part or in whole to form various embodiments that all fall within the scope of the disclosure.

Meanwhile, the digital device and the control method thereof according to the disclosure may be implemented as code that can be written on a processor-readable recording medium and thus read by a processor provided in a networked device. The processor-readable recording medium may be any type of recording device in which data is stored in a processor-readable manner. The processor-readable recording medium may include, for example, a ROM, a RAM, a magnetic tape, a floppy disc, and an optical data storage device and may be implemented in the form of a carrier wave transmitted over the Internet. The processor-readable recording medium can be distributed over a plurality of computer systems connected to a network so that processor-readable code is written thereto and executed therefrom in a decentralized manner.

As is apparent from the above description, according to one embodiment, it is possible for a user to easily share an image with at least one person contained in the image through an image sharing interface displayed on a display unit.

According to another embodiment, in a case in which an image sensed through a camera unit is displayed on the display unit, it is possible for the user to capture the sensed image through at least one input signal and to easily transmit the captured image to an address of at least one person contained in the image.

According to another embodiment, in a case in which an image stored in a storage unit is displayed on the display unit, it is possible for the user to easily transmit the displayed image to an address of at least one person contained in the image through at least one input signal.

According to a further embodiment, it is possible for the user to easily share an image with a person recognized from the image through an image sharing interface provided in the form of various user interfaces.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

In addition, the disclosure describes both a device invention as well as a method invention, and descriptions of both inventions may be complementarily applied as needed.

What is claimed is:
1. A digital device comprising:
a camera configured to sense an image;
a storage configured to store the image;
a sensor configured to detect a user input and transmit an input signal according to a detected result to a processor; and
the processor configured to control a display unit to display the image and a communication unit to transmit the image respectively,
wherein the processor is further configured to:
recognize at least one person contained in an image displayed on an image display interface, wherein the image display interface displays the image sensed through the camera in real time,
count a number of capturing which indicates a number of images containing the at least one recognized person among images stored in the past, count a number of sharing which indicates a number of images transmitted to an address of the at least one recognized person among the images stored in the past, display an image sharing interface, wherein the image sharing interface comprises:
    at least one icon displaying a face of each recognized person contained in the image displayed on the image display interface,
    at least one capturing count indicator displaying the number of images containing the at least one recognized person among the images stored in the past, and
    at least one sharing count indicator displaying the number of images transmitted to the address of the at least one recognized person among the images stored in the past, the at least one sharing count indicator being displayed adjacent to the at least one icon displaying the face of each recognized person, detect a first input signal to the at least one icon indicating the at least one recognized person, capture the image displayed on the image display interface and transmit the captured image to the address of the person corresponding to the at least one icon, and display an updated number of sharing on the sharing count indicator of the person corresponding to the at least one icon.

2. The digital device according to claim 1, wherein the first input signal comprises a signal to select the at least one icon indicating the at least one recognized person.

3. The digital device according to claim 2, wherein the processor is further configured to:
    detect a second input signal to an image capturing trigger after detecting the first input signal,
    store the image displayed on the image display interface and transmit the stored image to the address of the person corresponding to the at least one icon based on the detected second input signal,
    display the updated number of sharing on the sharing count indicator of the person corresponding to the at least one icon, and
    display updated number of capturing on the capturing count indicator of the at least one recognized person contained in the image.

4. The digital device according to claim 1, wherein the processor is further configured to:
    detect a second input signal to an image capturing trigger,
    store the image displayed on the image display interface and transmit the stored image to an address of a predetermined person of the at least one recognized person based on the detected second input signal,
    display updated number of sharing on a sharing count indicator of the predetermined person, and
    display updated number of capturing on the capturing count indicator of the at least one recognized person contained in the image.

5. The digital device according to claim 1, wherein the image display interface displays an image stored in the storage.

6. The digital device according to claim 5, wherein the first input signal comprises a signal to select the at least one icon indicating the at least one recognized person.

7. The digital device according to claim 6, wherein the processor is further configured to:
    detect a third input signal after detecting the first input signal,
    transmit the stored image to the address of the person corresponding to the at least one icon based on the detected third input signal, and
    display an updated number of sharing on the sharing count indicator of the person corresponding to the at least one icon.

8. The digital device according to claim 1, wherein the capturing count indicator is displayed adjacent to the at least one icon indicating the at least one recognized person.

9. The digital device according to claim 1, wherein the first input signal comprises at least one selected from among a touch input, a hovering input, and a drag input.

10. The digital device according to claim 1, wherein the address of the at least one person corresponds to an email address of the at least one person or an Internet protocol (IP) address of a device owned by the at least one recognized person.

11. The digital device according to claim 1, wherein the number of capturing indicates the number of images, stored in the storage, containing the at least one person when counting the number of capturing.

12. The digital device according to claim 1, wherein, the number of capturing indicates the number of the images, stored in the storage, containing the at least one person, before at least some of the images stored in the storage are deleted, when the at least some of the images stored in the storage are deleted.

13. The digital device according to claim 1, wherein the number of sharing indicates the number of images, stored in the storage, transmitted to the address of the at least one person when counting the number of sharing.

14. The digital device according to claim 1, wherein, the number of sharing indicates the number of the images transmitted to the address of the at least one recognized person before the images transmitted to the address of the at least one recognized person are deleted, when images transmitted to the address of the at least one recognized person are deleted from images stored in the storage.

15. The digital device according to claim 1, wherein the image sharing interface provides the capturing count indicator and the sharing count indicator before updated and the capturing count indicator and the sharing count indicator after updated with different graphical effects.

16. The digital device according to claim 1, wherein the at least one icon indicating the at least one person is displayed on a position of the face of the at least one person recognized from the image displayed on the image display interface in an overlaying fashion.

17. A control method of a digital device comprising:
    recognizing at least one person contained in an image displayed on an image display interface, wherein the image display interface displays the image sensed through a camera unit in real time;
    counting a number of capturing which indicates a number of images containing the at least one recognized person among images stored in the past;
    counting a number of sharing which indicates a number of the images transmitted to an address of the at least one recognized person among the images stored in the past;
    displaying an image sharing interface, wherein the image sharing interface comprises:
        at least one icon displaying a face of each recognized person contained in the image displayed on the image display interface,
        at least one capturing count indicator displaying the number of images containing the at least one recognized person among the images stored in the past, and at least one sharing count indicator displaying the number of images transmitted to the address of the at least one recognized person among the images stored in the past, the at least one sharing count indicator being displayed adjacent to the at least one icon displaying the face of each recognized person;

detecting a first input signal to the at least one icon indicating the at least one recognized person;

capturing the image displayed on the image display interface and transmitting the captured image to the address of the person corresponding to the at least one icon; and displaying an updated number of sharing on the sharing count indicator of the person corresponding to the at least one icon.

18. The control method of claim 17, further comprising displaying the at least one icon on a position of the face of the at least one person recognized from the image displayed on the image display interface in an overlaying fashion.

\* \* \* \* \*